(12) United States Patent
Abedini et al.

(10) Patent No.: US 11,728,857 B2
(45) Date of Patent: Aug. 15, 2023

(54) MAXIMUM PERMISSIBLE EXPOSURE MANAGEMENT OF REPEATERS AND REFLECTORS

(71) Applicant: QUALCOMM Incorporated, San Diego, CA (US)

(72) Inventors: Navid Abedini, Basking Ridge, NJ (US); Tao Luo, San Diego, CA (US); Junyi Li, Franklin Park, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 17/216,472

(22) Filed: Mar. 29, 2021

(65) Prior Publication Data
US 2022/0311487 A1    Sep. 29, 2022

(51) Int. Cl.
*H04B 7/06* (2006.01)
*H04L 5/14* (2006.01)
*H04W 72/044* (2023.01)
*H04W 72/53* (2023.01)

(52) U.S. Cl.
CPC ......... *H04B 7/0617* (2013.01); *H04L 5/1469* (2013.01); *H04W 72/0473* (2013.01); *H04W 72/53* (2023.01)

(58) Field of Classification Search
CPC . H04B 7/0617; H04B 7/15528; H04L 5/1469; H04W 72/0473; H04W 72/53
See application file for complete search history.

(56) References Cited

U.S. PATENT DOCUMENTS

| | | | |
|---|---|---|---|
| 2021/0175919 A1* | 6/2021 | Badic | H04W 72/0446 |
| 2022/0256473 A1* | 8/2022 | Kiilerich Pratas | H04W 52/283 |
| 2022/0264481 A1* | 8/2022 | Caporal Del Barrio | H04W 52/146 |

\* cited by examiner

*Primary Examiner* — Eric Myers
(74) *Attorney, Agent, or Firm* — Holland & Hart LLP

(57) ABSTRACT

Methods, systems, and devices for wireless communications are described. A relay node may detect that a person is within a proximity threshold of the relay node, the proximity threshold being associated with a maximum permissible exposure limit. The relay node may determine, based at least in part on the detecting, that a first beamforming configuration is to be updated, the first beamforming configuration associated with beamformed communications relayed by the relay node between a first wireless node and a second wireless node using a first beam. The relay node may identify a second beamforming configuration for relay of the beamformed communications between the first wireless node and the second wireless node via a second beam having an exposure indicia that satisfies the maximum permissible exposure limit. The relay node may relay the beamformed communications between the wireless nodes using the second beam in accordance with the second beamforming configuration.

19 Claims, 16 Drawing Sheets

MAXIMUM PERMISSIBLE EXPOSURE MANAGEMENT OF REPEATERS AND REFLECTORS

FIELD OF TECHNOLOGY

The following relates to wireless communications, including maximum permissible exposure management of repeaters and reflectors.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support maximum permissible exposure management of repeaters and reflectors. Generally, aspects of the described techniques provide a relay node that may detect or otherwise determine that a person is within a proximity threshold of the relay node, thus potentially violating a maximum permissible exposure (MPE) limit. Based on detection of the person, the relay node may determine that its current beamforming configuration is to be updated (e.g., from a first beamforming configuration to a second beamforming configuration). Accordingly, the relay node may identify the second beamforming configuration to use for relaying beamformed communications between a wireless node (e.g., a network entity, a base station, a user equipment (UE), etc.) and a second wireless node (e.g., a base station, a UE, etc.). The updated beamforming configuration may update spatial aspects of the beamformed communications (e.g., a change in beamforming direction, beamform shape, etc.), the transmit power of the beamformed communications, and the like. The relay node may autonomously update its beamforming configuration and/or may rely on a control node to provide the updates. When the control node is either involved in updating the beamforming configuration and/or is simply informed that the relay node has updated its beamforming configuration, the control node may also change its scheduling decisions for communications involving the relay node to address the MPE violation at the relay node. High priority signals (e.g., synchronization signal blocks (SSBs), channel state information reference signals (CSI-RSs), etc.) may be protected during the beamforming configuration updates.

A method for wireless communication at a relay node associated with a control node is described. The method may include detecting that a person is within a proximity threshold of the relay node, the proximity threshold being associated with a MPE limit, determining, based on the detecting, that a first beamforming configuration is to be updated, the first beamforming configuration associated with beamformed communications relayed by the relay node between a first wireless node and a second wireless node using a first beam, identifying a second beamforming configuration for relay of the beamformed communications between the first wireless node and the second wireless node via a second beam having an exposure indicia that satisfies the MPE limit, and relaying the beamformed communications between the first wireless node and the second wireless node using the second beam in accordance with the second beamforming configuration.

An apparatus for wireless communication at a relay node associated with a control node is described. The apparatus may include a processor, memory coupled with the processor, and instructions stored in the memory. The instructions may be executable by the processor to cause the apparatus to detect that a person is within a proximity threshold of the relay node, the proximity threshold being associated with a MPE limit, determine, based on the detecting, that a first beamforming configuration is to be updated, the first beamforming configuration associated with beamformed communications relayed by the relay node between a first wireless node and a second wireless node using a first beam, identify a second beamforming configuration for relay of the beamformed communications between the first wireless node and the second wireless node via a second beam having an exposure indicia that satisfies the MPE limit, and relay the beamformed communications between the first wireless node and the second wireless node using the second beam in accordance with the second beamforming configuration.

Another apparatus for wireless communication at a relay node associated with a control node is described. The apparatus may include means for detecting that a person is within a proximity threshold of the relay node, the proximity threshold being associated with a MPE limit, means for determining, based on the detecting, that a first beamforming configuration is to be updated, the first beamforming configuration associated with beamformed communications relayed by the relay node between a first wireless node and a second wireless node using a first beam, means for identifying a second beamforming configuration for relay of the beamformed communications between the first wireless node and the second wireless node via a second beam having an exposure indicia that satisfies the MPE limit, and means for relaying the beamformed communications between the first wireless node and the second wireless node using the second beam in accordance with the second beamforming configuration.

A non-transitory computer-readable medium storing code for wireless communication at a relay node associated with a control node is described. The code may include instructions executable by a processor to detect that a person is within a proximity threshold of the relay node, the proximity threshold being associated with a MPE limit, determine, based on the detecting, that a first beamforming configuration is to be updated, the first beamforming configuration associated with beamformed communications relayed by the relay node between a first wireless node and a second wireless node using a first beam, identify a second beamforming configuration for relay of the beamformed communications between the first wireless node and the second wireless node via a second beam having an exposure indicia that satisfies the MPE limit, and relay the beamformed communications between the first wireless node and the second wireless node using the second beam in accordance with the second beamforming configuration.

Some examples of the method, apparatuses, and non-transitory computer-readable medium described herein may further include operations, features, means, or instructions for providing to the control node and triggered by the detecting that the person may be within the proximity threshold of the relay node, a first information to assist in determination of the second beamforming configuration.

In some examples of the method, apparatuses, and non-transitory computer-readable medium described herein, the first information includes a distance of the person from the relay node, a direction of the person from the relay node, or both.

In some examples of the method, apparatuses, and non-transitory computer-readable medium described herein, the first information includes a first transmit power of the first beamforming configuration, a second transmit power of the second beamforming configuration, a first power headroom value of the first beamforming configuration, a second power headroom value of the second beamforming configuration, or a combination thereof.

In some examples of the method, apparatuses, and non-transitory computer-readable medium described herein, the first information includes a first duty cycle of the first beamforming configuration, a second duty cycle of the second beamforming configuration, or both.

In some examples of the method, apparatuses, and non-transitory computer-readable medium described herein, the first information includes a first request to perform the beamformed communications using the second beam, a second request for a receive beam of the second wireless node to use for the beamformed communications, a change request for a transmission configuration indicator state (TCI) state for the beamformed communications, or a combination thereof.

Some examples of the method, apparatuses, and non-transitory computer-readable medium described herein may further include operations, features, means, or instructions for obtaining, responsive to the first information, second information associated with the second beamforming configuration.

In some examples of the method, apparatuses, and non-transitory computer-readable medium described herein, the second information associated with the second beamforming configuration includes a maximum transmit power level for the second beamforming configuration, a duty cycle for a beamforming direction using the second beamforming configuration, the second beamforming configuration, or a combination thereof.

Some examples of the method, apparatuses, and non-transitory computer-readable medium described herein may further include operations, features, means, or instructions for determining that a priority level of a signal associated with the first beamforming configuration satisfies a priority threshold, where the second beamforming configuration may be based on the priority level of the signal satisfying the priority threshold.

In some examples of the method, apparatuses, and non-transitory computer-readable medium described herein, the second beamforming configuration maintains a transmit power of the signal based on the priority level of the signal satisfying the priority threshold.

In some examples of the method, apparatuses, and non-transitory computer-readable medium described herein, the signal includes at least one of an SSB, a CSI-RS, or both.

Some examples of the method, apparatuses, and non-transitory computer-readable medium described herein may further include operations, features, means, or instructions for providing to the control node an indication that the relay node may be relaying the beamformed communications between the first wireless node and the second wireless node using the second beam.

Some examples of the method, apparatuses, and non-transitory computer-readable medium described herein may further include operations, features, means, or instructions for identifying a time division duplexing (TDD) configuration for the beamformed communications, where the second beamforming configuration may be based on the TDD configuration.

Some examples of the method, apparatuses, and non-transitory computer-readable medium described herein may further include operations, features, means, or instructions for performing a proximity detection procedure to detect whether the person may be within the proximity threshold of the relay node using one or more proximity detection sensors.

In some examples of the method, apparatuses, and non-transitory computer-readable medium described herein, the proximity detection procedure may be performed on per-beam basis, on a per-beamforming configuration basis, on a per-active beam configuration, on a per-requested beam basis, on a per-beamforming direction basis, or a combination thereof.

In some examples of the method, apparatuses, and non-transitory computer-readable medium described herein, the relay node includes a repeater associated with the control node or a reflector associated with the control node.

A method for wireless communication at a control node is described. The method may include receiving, from a relay node having a first beamforming configuration and associated with the control node, first information to assist in determination of a second beamforming configuration for the relay node, the receiving of the first information associated with the relay node detecting that a person is within a proximity threshold of the relay node, the proximity threshold being associated with a MPE limit and the first beamforming configuration being associated with beamformed communications relayed by the relay node between a first wireless node and a second wireless node using a first beam, identifying, based on the first information, the second beamforming configuration for relaying the beamformed communications between the first wireless node and the second wireless node via a second beam having an exposure indicia that satisfies the MPE limit at the relay node, and providing to the relay node a second information associated with the second beamforming configuration according to the identifying.

An apparatus for wireless communication at a control node is described. The apparatus may include a processor, memory coupled with the processor, and instructions stored in the memory. The instructions may be executable by the processor to cause the apparatus to receive, from a relay node having a first beamforming configuration and associated with the control node, first information to assist in determination of a second beamforming configuration for the relay node, the receiving of the first information associated with the relay node detecting that a person is within a proximity threshold of the relay node, the proximity threshold being associated with a MPE limit and the first beamforming configuration being associated with beamformed communications relayed by the relay node between a first wireless node and a second wireless node using a first beam, identify, based on the first information, the second beamforming configuration for relaying the beamformed communications between the first wireless node and the second wireless node via a second beam having an exposure indicia that satisfies the MPE limit at the relay node, and provide to the relay node a second information associated with the second beamforming configuration according to the identifying.

Another apparatus for wireless communication at a control node is described. The apparatus may include means for receiving, from a relay node having a first beamforming configuration and associated with the control node, first information to assist in determination of a second beamforming configuration for the relay node, the receiving of the first information associated with the relay node detecting that a person is within a proximity threshold of the relay node, the proximity threshold being associated with a MPE limit and the first beamforming configuration being associated with beamformed communications relayed by the relay node between a first wireless node and a second wireless node using a first beam, means for identifying, based on the first information, the second beamforming configuration for relaying the beamformed communications between the first wireless node and the second wireless node via a second beam having an exposure indicia that satisfies the MPE limit at the relay node, and means for providing to the relay node a second information associated with the second beamforming configuration according to the identifying.

A non-transitory computer-readable medium storing code for wireless communication at a control node is described. The code may include instructions executable by a processor to receive, from a relay node having a first beamforming configuration and associated with the control node, first information to assist in determination of a second beamforming configuration for the relay node, the receiving of the first information associated with the relay node detecting that a person is within a proximity threshold of the relay node, the proximity threshold being associated with a MPE limit and the first beamforming configuration being associated with beamformed communications relayed by the relay node between a first wireless node and a second wireless node using a first beam, identify, based on the first information, the second beamforming configuration for relaying the beamformed communications between the first wireless node and the second wireless node via a second beam having an exposure indicia that satisfies the MPE limit at the relay node, and provide to the relay node a second information associated with the second beamforming configuration according to the identifying.

Some examples of the method, apparatuses, and non-transitory computer-readable medium described herein may further include operations, features, means, or instructions for identifying one or more scheduling configurations for the beamformed communications using the second beam according to the second beamforming configuration based on the first information provided by the relay node to assist in determination of the second beamforming configuration.

Some examples of the method, apparatuses, and non-transitory computer-readable medium described herein may further include operations, features, means, or instructions for determining that a priority level of a signal associated with the first beamforming configuration satisfies a priority threshold, where the second beamforming configuration may be based on the priority level of the signal satisfying the priority threshold.

In some examples of the method, apparatuses, and non-transitory computer-readable medium described herein, the second beamforming configuration maintains a transmit power of the signal based on the priority level of the signal satisfying the priority threshold.

In some examples of the method, apparatuses, and non-transitory computer-readable medium described herein, the signal includes at least one of an SSB, a CSI-RS, or both.

Some examples of the method, apparatuses, and non-transitory computer-readable medium described herein may further include operations, features, means, or instructions for obtaining from the relay node an indication that the relay node may be relaying the beamformed communications between the first wireless node and the second wireless node using the second beam.

Some examples of the method, apparatuses, and non-transitory computer-readable medium described herein may further include operations, features, means, or instructions for providing, to a network entity, the first information provided by the relay node to assist in determination of the second beamforming configuration and obtaining, from the network entity, an indication of the second beamforming configuration based on providing the first information to the network entity.

In some examples of the method, apparatuses, and non-transitory computer-readable medium described herein, the first information provided by the relay node to assist in determination of the second beamforming configuration includes a distance of the person from the relay node, a direction of the person from the relay node, the first beamforming configuration, the second beamforming configuration, a first transmit power of the first beamforming configuration, a second transmit power of the second beamforming configuration, a first duty cycle of the first beamforming configuration, a second duty cycle of the second beamforming configuration, a first request to perform the beamformed communications using the second beam, a second request for a receive beam of the second wireless node to use for the beamformed communications, a change request for a TCI state for the beamformed communications, or a combination thereof.

In some examples of the method, apparatuses, and non-transitory computer-readable medium described herein, the second information associated with the second beamforming configuration includes a maximum transmit power level for the second beamforming configuration, a duty cycle for a beamforming direction using the second beamforming configuration, the second beamforming configuration, a reflector coefficient of a reflection pattern associated with the second beam, or a combination thereof.

In some examples of the method, apparatuses, and non-transitory computer-readable medium described herein, the control node includes a base station or a UE.

DETAILED DESCRIPTION

Figure 1:
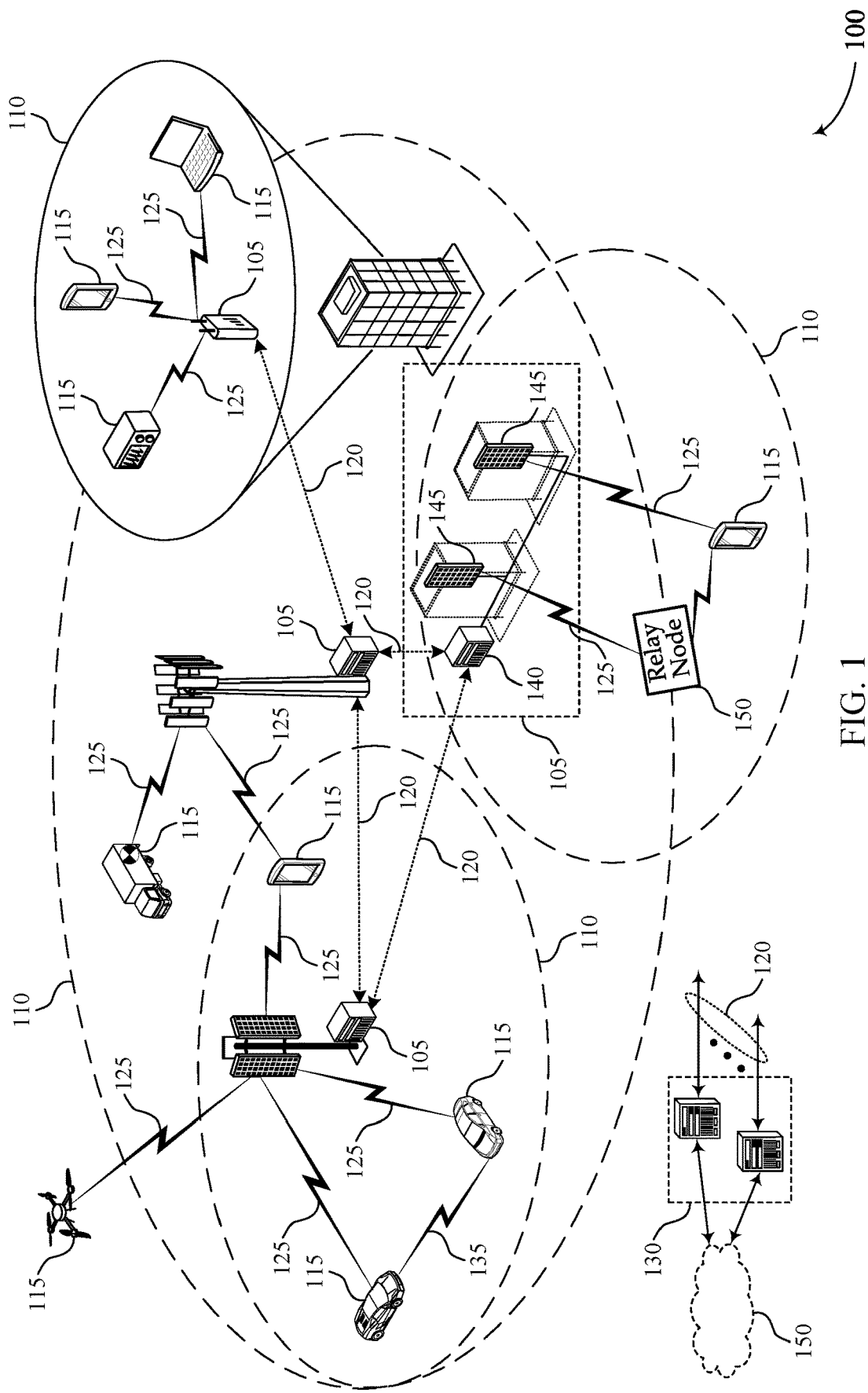
FIG. 1 illustrates an example of a wireless communications system that supports maximum permissible exposure (MPE) management of repeaters and reflectors in accordance with aspects of the present disclosure.

Wireless communication systems may rely on repeaters/reflectors (e.g., relay nodes) deployed within the network to extend a coverage area. The relay nodes may also improve spatial diversity, reliability, and/or capacity of the network. The relay nodes may be fixed in location and, in some cases have limited dynamic configurability (such as a smart relay node). Smart relay nodes may be autonomously smart in that the relay nodes are able to learn and reconfigure properties as needed, or alternatively smart relay nodes may be network-controlled, meaning that the nodes are able to be updated remotely by a control node (e.g., such as a network entity, a base station, etc., via an interface). These dynamically configurable relay nodes, however, are also constrained by maximum permissible exposure (MPE) limits that regulate the power density of radio frequency (RF) transmissions to address skin absorption/heating concerns. While the smart relay nodes are initially positioned so as to minimize concerns from humans being near the nodes, sometimes humans do approach the nodes and violations of MPE limits could occur.

Aspects of the disclosure are initially described in the context of wireless communications systems. Generally, aspects of the described techniques provide a relay node that may detect or otherwise determine that a person is within a proximity threshold of the relay node, thus potentially/actually violating an MPE limit. Based on detection of the person, the relay node may determine that its current beamforming configuration is to be updated (e.g., from a first beamforming configuration to a second beamforming configuration). Accordingly, the relay node may identify the second beamforming configuration to use for relaying beamformed communications between a first wireless node (e.g., a network entity, a base station, a user equipment (UE), etc.) and a second wireless node (e.g., a base station, a UE, etc.). The updated beamforming configuration may update spatial aspects of the beamformed communications (e.g., a change in beamforming direction, beamform shape, etc.), the transmit power of the beamformed communications, and the like.

The relay node may autonomously update its beamforming configuration and/or may rely on the control node to provide the updates. When the control node is either involved in updating the beamforming configuration and/or is simply informed that the relay node has updated its beamforming configuration, the control node may also change its scheduling decisions for communications involving the relay node to address the MPE violation at the relay node. High priority signals (e.g., synchronization signal blocks (SSBs), channel state information reference signals (CSI-RSs), etc.) may be protected during the beamforming configuration updates.

Aspects of the disclosure are further illustrated by and described with reference to apparatus diagrams, system diagrams, and flowcharts that relate to MPE management of repeaters and reflectors.

FIG. 1 illustrates an example of a wireless communications system 100 that supports MPE management of repeaters and reflectors in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may include one or more relay nodes 150. The relay nodes 150 may be examples of repeaters and/or reflectors. The relay nodes 150 may generally relay beamformed communications between a first wireless node (e.g., a base station 105 and/or UE 115) and a second wireless node (e.g., a base station 105, a UE 115, etc.). Each relay node 150 may be associated with one or more base stations 105 and/or may operate independently from any base station 105. Relay nodes 150 may be deployed within wireless communications system 100 to extend the coverage area 110, improve spatial diversity, increase throughput, and the like.

The relay node 150 may detect that a person is within a proximity threshold of the relay node 150, the proximity threshold being associated with an MPE limit. The relay node 150 may determine, based at least in part on the detecting, that a first beamforming configuration is to be updated, the first beamforming configuration associated with beamformed communications relayed by the relay node 150 between a first wireless node and a second wireless node using a first beam. The relay node 150 may identify a second beamforming configuration for relay of the beamformed communications between the first wireless node and the second wireless node via a second beam having an exposure indicia that satisfies the MPE limit. The relay node 150 may relay the beamformed communications between the first wireless node and the second wireless node using the second beam in accordance with the second beamforming configuration.

A control node (e.g., a UE 115, base station 105, and/or a function within core network 130) may receive, from a relay node 150 having a first beamforming configuration and associated with the control node, first information to assist in determination of a second beamforming configuration for the relay node 150, the receiving of the first information associated with the relay node 150 detecting that a person is within a proximity threshold of the relay node 150, the proximity threshold being associated with a MPE limit and the first beamforming configuration being associated with beamformed communications relayed by the relay node 150 between a first wireless node and a second wireless node using a first beam. The control node may identify, based at least in part on the first information, the second beamforming configuration for relaying the beamformed communications between the first wireless node and the second wireless node via a second beam having an exposure indicia that satisfies the MPE limit at the relay node 150. The control node may provide to the relay node 150 a second information associated with the second beamforming configuration according to the identifying.

Figure 2:
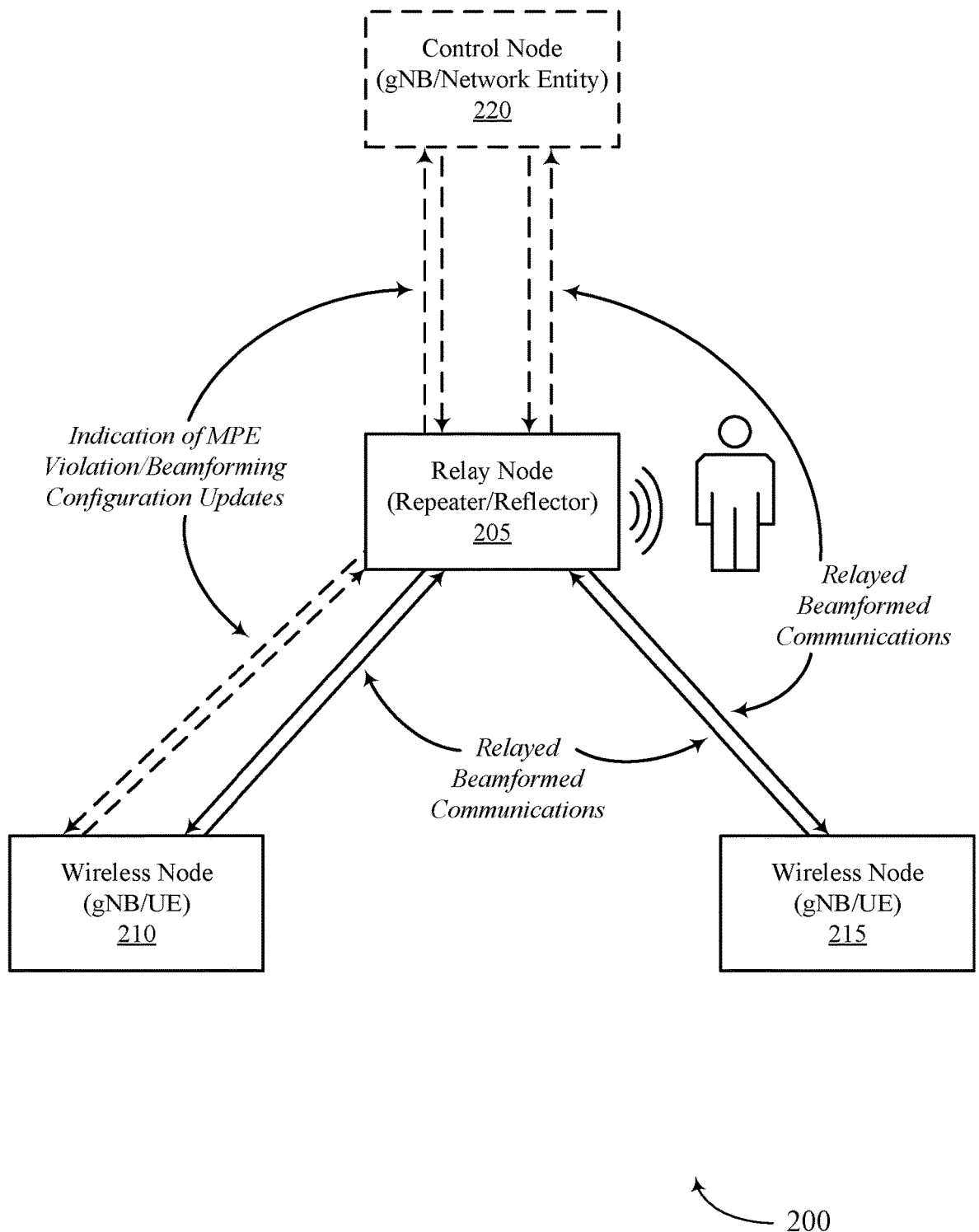
FIG. 2 illustrates an example of a wireless communications system that supports MPE management of repeaters and reflectors in accordance with aspects of the present disclosure.

FIG. 2 illustrates an example of a wireless communications system 200 that supports MPE management of repeaters and reflectors in accordance with aspects of the present disclosure. Wireless communications system 200 may implement aspects of wireless communications system 100. Wireless communications system 200 may include relay node 205, wireless node 210, wireless node 215, and optionally a control node 220, which may be examples of the corresponding devices described herein.

That is, aspects of the described techniques generally address relaying techniques performed by relay node 205 as it relays beamformed communications between wireless node 215 (an example of a first wireless node) and a second wireless node, which may either be wireless node 210 or control node 220 (which may also be referred to as a wireless node). For example, the relay node 205 may be an example of a repeater and/or reflector that is associated with a base station. The wireless node 215 may be an example of a UE or a base station, such as is described herein. However, it is to be understood that the techniques described with respect to the relayed beamforming communications may be communications relayed between a base station and UE, between two base stations, and/or between two UEs. Accordingly, in some examples the relayed beamformed communications may be between wireless node 210 (e.g., a first UE or first base station, which may be referred to as a first wireless node in this example) and wireless node 215 (e.g., a second UE or second base station, which may be referred to as a second wireless node in this example) that are controlled or otherwise managed by control node 220 (e.g., a base station, alone or in coordination with a network entity). In some examples the relayed beamformed communications may be between wireless node 215 (e.g., a UE) and control node 220 (e.g., a base station) that are controlled or otherwise managed by control node 220 (e.g., the base station, alone or in coordination with a network entity). In some examples, the relay node 205 may autonomously manage the beamformed communications relayed between wireless node 215 (e.g., the first UE or first base station) and wireless node 210 or control node 220 (e.g., the second UE or second base station), e.g., without coordination or control by control node 220. In some examples, aspects of the relayed beamformed communications may be monitored, controlled, or otherwise managed by the control node.

Wireless communications systems, such as wireless communications system 200, are typically configured with an MPE limit (which also may include a specific absorption rate (SAR) limit). Broadly, the MPE limit may generally correspond to a federal communication commission (FCC) regulated power density of radio frequency (RF) transmitters within the wireless communications system to address skin heating concerns (e.g., based on studies that have shown that non-ionizing RF energy can damage human tissue due to heat, linkage between RF exposure and cancer, and the like). The MPE limit is typically specified in terms of either short-term or medium-term temporal averaging and/or local/medium spatial averaging of the radiated power. For example, in higher frequency bands the MPE limit may correspond to a power density per unit area and in lower frequency bands (e.g., <6 Ghz) the SAR may correspond to a power density per volume.

Moreover, wireless communications systems, such as wireless communications system 200, may deploy repeaters and/or reflectors to extend the coverage area of the network nodes, increase spatial diversity, reliability, capacity, and the like. Relay node 205 illustrates a non-limiting example of the deployment of such repeaters/reflectors. Such deployment may include different types of repeaters/reflectors. A first type (e.g., type 1) may include traditional non-configurable repeaters/reflectors being deployed with fixed/semi-fixed configurations. A second type (e.g., type 2) may include smart repeaters/reflectors being deployed with dynamically configurable properties. Such smart repeaters/reflectors may also be divided into two subgroups. The first subgroup may include autonomously smart repeaters/reflectors being deployed where the node is smart enough (e.g., able to autonomously) learn and reconfigure its properties as needed. The second subgroup may include network-controlled smart repeaters/reflectors where the node can be controlled remotely by a control node (e.g., such as control node 220, which may be an example of a base station or network entity). Generally, the second subgroup may rely on an interface established between the control node and the repeater/reflector.

In this context, references to updating a configuration/properties of the repeaters/reflectors may include (e.g., which may also be referred to as beamforming configurations in some examples), but are not limited to, the power settings (e.g., such as transmit power levels, both instantaneous as well as averaged transmit power levels over a given window), the selection of transmit and/or receive beams, the forwarding direction of the beamformed communications, and a like. For reflectors, updating such configuration/properties of the reflectors may include, but are not limited to, reflecting coefficients, reflecting directions, and the like. References herein to updating a beamforming configuration may include any such configuration/properties, alone or in any combination.

For deployment of some traditional repeaters/reflectors (e.g., those with fixed or semi-fixed beamforming configurations), MPE management may include the repeater/reflector (e.g., relay node 205) being placed in such a manner that no user can get too close to the repeater (e.g., placed on a tower, building top, etc.). When such placement is not fully compatible, the traditional repeaters/reflectors may be configured with initial beamforming configurations (e.g., in terms of beamforming parameters/power configuration) selected to avoid MPE issues in risky directions (e.g., in directions where the people might be located).

However, in accordance with aspects of the described techniques, such repeater/reflectors (e.g., relay node 205) may be equipped with, or otherwise support detecting that a person is within a proximity threshold of the relay node 205 (e.g., the proximity threshold based, at least to some degree, on the MPE limit). For example, relay node 205 may be equipped with, or otherwise support, a proximity detection capability that runs a procedure (e.g., a background procedure) to detect nearby users. The proximity detection procedure may be on a per-beamforming configuration basis (e.g., for all of the transmit beams in the codebook of relay node 205), on a per-active beamforming configuration basis (e.g., only for the active or configured beam(s)/beamforming configuration(s)), on a per-requested beamforming configuration basis (e.g., based on a requested/identified beam), and/or on a per-beamforming direction basis (e.g., for both or any of the downlink/uplink forwarding directions). The proximity detection procedure may be based on location information associated with a user of a UE, based on a camera sensor or other detection sensor (e.g., such as any combination of active and/or passive sensors) that senses the person, and the like.

Based on detecting that the person is within the proximity threshold (e.g., the MPE violation), the relay node 205 may generally update its beamforming configuration (e.g., from a first beamforming configuration to a second beamforming configuration having different beamforming parameters, different transmit power levels, etc.). For example, based on detecting the person within the proximity threshold, relay node 205 may determine that the first beamforming configuration (e.g., the beamforming configuration currently being used for beamformed communications being relayed by relay node 205 using a first beam) is to be updated. The relay node 205 may update its beamforming configuration autonomously and/or based on coordination between the relay node 205 and a control node (e.g., such as wireless node 210 and/or control node 220, which may coordinate with a network entity).

For example, the relay node 205 may autonomously select, determine, or otherwise identify a second beamforming configuration for relaying the beamformed communications. Broadly, the second beamforming configuration (e.g., the updated beamforming configuration) may use a second beam that, when relaying beamformed communications, satisfies the MPE limit for the relay node 205. This may include relay node 205 adjusting (e.g., according to the second beamforming configuration for the second beam) or selecting a transmit power level and/or updating various beamforming parameters for the beamformed communications being relayed by relay node 205. Examples of the beamforming parameters may include, but are not limited to, selecting a different transmit beam and/or receive beam, selecting a different beamforming direction, selecting a different beamforming profile (e.g., narrow beam width vs wide beam width, or vice versa), and the like.

In some examples, this may include the autonomous or semi-smart repeater/reflector (e.g., relay node 205) handling MPE management by learning (e.g., monitoring to determine) the TDD configuration of the beamformed communications. Based on the TDD configuration, the repeater/reflector may have an improved understanding of the uplink/downlink duty cycles and can update/select its transmit power level, beamforming parameters, etc. (e.g., beamforming configuration), in view of the uplink/downlink duty cycle. Accordingly, relay node 205 may identify or otherwise determine the TDD configuration for the beamformed communications and update its beamforming configuration based on the TDD configuration.

In some examples, this may include the relay node 205 transmitting or otherwise providing an indication of a first information to the control node (e.g., wireless node 210 and/or control node 220, depending on the nature of relaying operations being performed by relay node 205). Broadly, the first information may be used to determine the second beamforming configuration. That is, the relay node 205 may convey at least some information to its control node that the MPE violation has been detected, e.g., that the user is within the proximate distance to the relay node 205.

In some examples, the indication provided to the control node by relay node 205 may include raw information, such as the distance and/or direction of the detected user/person. This information may be based on a particular beam (e.g., beam identifier/index, beamforming direction, etc.). Accordingly, the first information in this example may correspond to the distance and/or direction of the person from the relay node 205.

In some examples, the indication provided to the control node by relay node 205 may include a beam-specific maximum transmit power level, a power headroom indication, and/or a power back-off level required to meet the MPE requirement (e.g., for both uplink and downlink). Accordingly, the first information in this example may correspond to the transmit power of the first and/or second beamforming configurations, the power headroom value for the first and/or second beamforming configurations, and the like.

In some examples, the indication provided to the control node by relay node 205 may include a required duty cycle. For example, the required duty cycle may be on a per-beam and/or per-maximum transmit power basis in order to meet the MPE requirements. Accordingly, the first information in this example may correspond to the duty cycle for the first and/or second beamforming configurations.

In some examples, the indication provided to the control node by relay node 205 may include a suggested beamforming change. For example, the suggested change may be to widen beams in some directions to reduce the effective isotropic radiated power (EIRP). In some aspects, this may be applied in the downlink forwarding direction. In some examples, this may include a suggested downlink receive beam change for some served UEs (e.g., such as a change of TCI state). In this example, the first information may include a first request to perform the beamformed communications using the second beam, a second request for a receive beam of the wireless node 215 to use for beamformed communications, a change request for the TCI state for the beamformed communications, and the like.

The relay node 205 may, e.g., in the autonomous and/or network configured examples, provide an indication to the control node (e.g., wireless node 210 and/or control node 220) that the relayed beamformed communications is using the second beam (e.g., an indication that the relay node 205 has updated its first beamforming configuration to the second beamforming configuration). For example, the relay node 205 may autonomously make a transmit power/beamforming change and then indicate the change to the network (e.g., to the control node, which may forward the information to a network entity). In some examples, this may be based on a preconfigured rule (e.g., when to perform a power back off, how to change the beamforming configuration, etc.).

Examples of the preconfigured rules may include, but are not limited to, in order to protect important signals like SSBs, CSI-RS, etc. (e.g., that are used for L3 mobility), relay node 205 forwarding them with constant power (e.g., with a set transmit power level). For example, relay node 205 may be notified to avoid autonomously changing the forwarding power or beamforming configurations of these signals. In some examples, relay node 205 may already know the resources and configuration of SSBs (e.g., acquired from RMSI) and/or it may just be indicated that the forwarding configuration of the SSBs (or a subset of them) should not be modified. In some examples, relay node 205 may not know the resources and configuration of CSI-RS, and instead of providing detailed configuration, the relay node 205 may be provided with a list of resources (e.g., a masking bitmap) whose transmissions should not be autonomously modified. In the situation where relay node 205 is not aware that there is an MPE issue, and it has to perform a power back off, it may prioritize the indicated important signals/resources (e.g., relay node 205 may forward them with the configured/constant transmit power, and reduce the power or cancel other transmissions in the neighboring window of the important signals/resources).

The relay node 205 and/or control node may, e.g., in the autonomous and/or network configured examples, may ensure that updating the beamforming configuration using intelligent scheduling to protect certain wireless signals. This may include relay node 205 and/or control node determining that a priority level of a signal associated with the first beamforming configuration satisfies a priority threshold. For example, the relay node 205 and/or control node may determine that certain signal types are priority signals and are therefore to be protected. Examples of such high priority signals include, but are not limited to, SSB signals, CSI-RS, tracking signals, beam management signals, and the like. For example, the second beamforming configuration may protect (e.g., maintain) the transmit power level of the signal associated with the higher priority level or otherwise ensure continued transmission of the protected signal. Accordingly, since SSB/CSI-RS/other high priority signal types are important for the functioning of the nodes within wireless communication system 200, relay node 205 and/or the control node (e.g., a base station) can make sure the downlink scheduling around these signals may guarantee a low duty cycle (e.g., to reduce the exposure) per problematic beam directions.

As one example, this may include if SSB m should be sent with X dB back off from the maximum transmit power to meet MPE limitations (e.g., assuming a 100% duty cycle), relay node 205 and/or the control node can make sure (and indicate) that no other downlink communications are scheduled (e.g., in the same downlink forwarding direction as SSB m) within a window of SSB m, so that SSB m can still be forwarded at full power by relay node 205. In an uplink example, this may include relay node 205 and/or the control node leveraging the fact that for some far away UEs (w/ low received power at the repeater), the repeater (e.g., relay node 205) may not operate at the full uplink transmit power level (e.g., it would be limited by the maximum amplification gain). In this situation, the scheduling decisions may include TDM the uplink signals from nearby and far away UEs such that the associated output transmit power level of repeater (that would have a non-uniform profile within a window) still meets the MPE requirement.

In the situation where the control node (e.g., wireless node 210 and/or control node 220, depending on the nature of the relaying operations being performed) assists with determining the second beamforming configuration, this may include the control node setting and indicating second information associated with the beamforming configuration. This may include the control node setting and indicating the beamforming configuration change for the downlink and/or uplink. Broadly, the second information may include various information that may include and/or may be used to select, the second beamforming configuration that relay node 205 is to use for relaying beamformed communications. Broadly, the second information may include the control node (alone or in cooperation with the network entity) setting and indicating the maximum transmit power per-beam direction for relay node 205 to use. In some examples, the second information may include the indication of a maximum transit power level for the second beamforming configuration, a duty cycle for a beamforming direction using the second beamforming configuration, and/or simply the second beamforming configuration.

In the situation were relay node 205 is an example of a reflector, such MPE limits may be defined and applicable to the reflectors. Generally, such MPE limits may focus on the radiation energy in some directions (e.g., effectively increasing EIRP). Such reflectors may also be configured with proximity detection capabilities. While such reflectors may not have any active amplification, they may be able to update, according to the second beamforming configuration, their reflecting coefficients to effectively change the reflection pattern in the problematic direction and distances.

Accordingly, the relay node 205 may perform relaying of the beamformed communications between the wireless node 215 (e.g., the second wireless node in this example) and the control node (e.g., the first wireless node in this example) using the second beam according to the second beamforming configuration (e.g., the updated beamforming configuration). The second beam may have an exposure indicia that satisfies the MPE limit of wireless communications system 200. For example, the transmit power level, beamforming parameters, etc., of the second beamforming configuration of the second beam may mitigate or eliminate RF exposure to the person proximate to the relay node 205.

Figure 3:
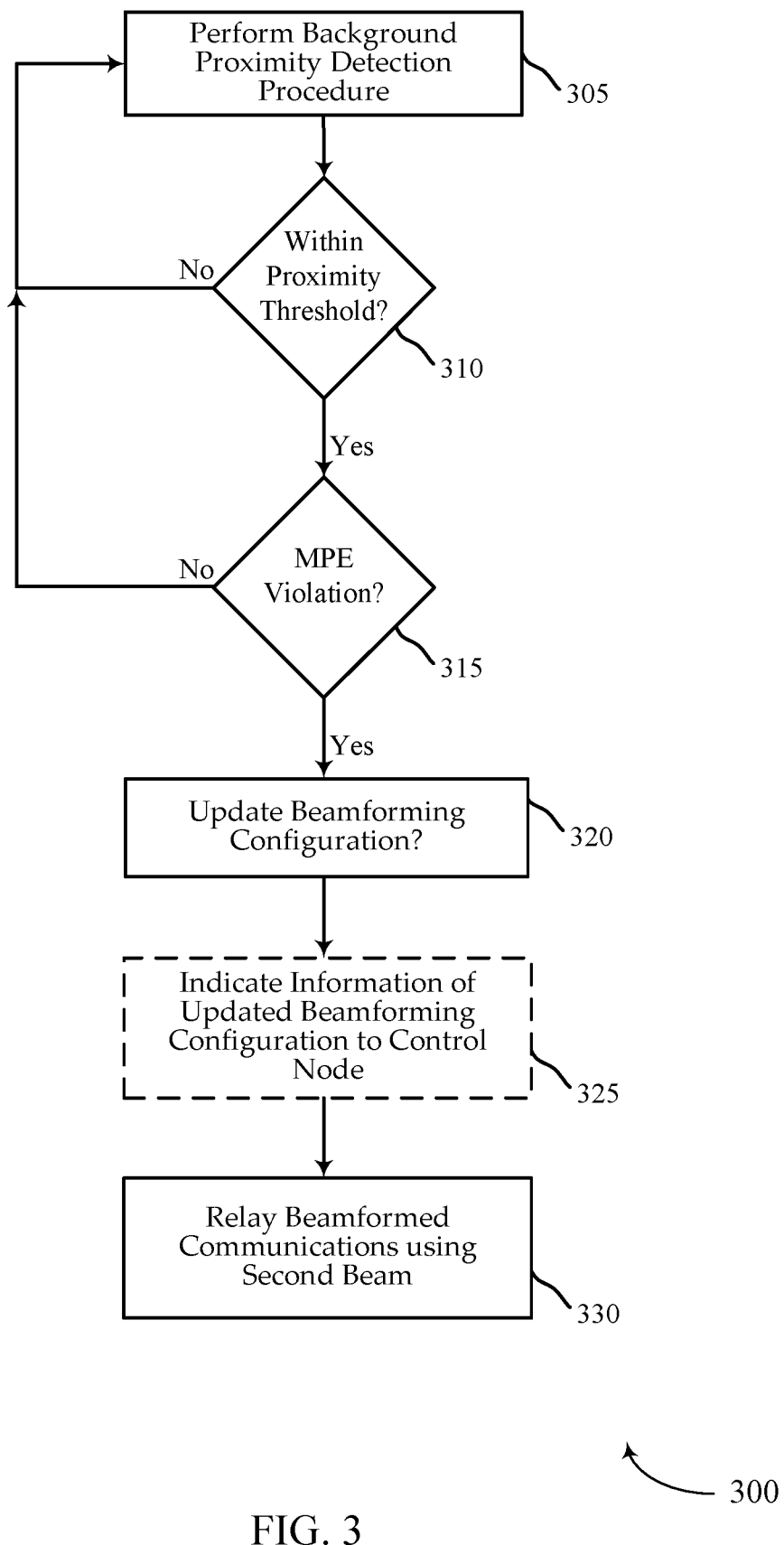
FIG. 3 illustrates an example of a method that supports MPE management of repeaters and reflectors in accordance with aspects of the present disclosure.

FIG. 3 illustrates an example of a method 300 that supports MPE management of repeaters and reflectors in accordance with aspects of the present disclosure. Method 300 may implement aspects of wireless communications systems 100 and/or 200. Aspects of method 300 may be implemented at, or implemented by, a relay node, which may be an example of a repeater/reflector as described herein.

At 305, the relay node may perform a proximity detection procedure to determine whether a person is within a proximity threshold of the relay node. The proximity detection procedure may be performed in a background operation. That is, the relay node may be relaying beamformed communications between a first wireless node and a second wireless node using a first beam associated with a first beamforming configuration. The relay node may also be equipped with one or more proximity detection sensors that are capable of, or otherwise support, detecting the presence/location/distance/orientation of a person near the relay node. The detection sensor(s) may be operating in the background, and may output a signal or other metric indicating that the person has been detected proximate to the relay node.

At 310, the relay node may identify or otherwise determine whether the person is proximate enough to the relay node such that the person is within the proximity threshold of the relay node. For example, the relay node may be configured with an MPE requirement to minimize RF radiations directed towards a person (e.g., to minimize skin heat/tissue damage due to the RF radiation). While the MPE requirement may be based on a short/medium-term temporal averaging and/or local/medium spatial averaging of the radiated power, the distance/direction of the person from the relay node may provide an indication of whether or not the person may or may not exceed the MPE requirements. If the relay node determines that the person is not within the proximity threshold, it may return to 305 and continue to perform the proximity detection procedure in the background.

If the relay node determines that the person is within the proximity threshold, at 315 the relay node may determine whether an MPE violation has occurred. For example, a person that is within the proximity threshold of the relay node may raise concerns regarding conformance to the MPE requirements. However, in some situations that person may be simply traversing the area surrounding the relay node, and may therefore leave the area as quickly as the person entered the area—thus negating any MPE violation concerns. For example, the person may leave the area fast enough such that the MPE requirements are maintained by the relay node. In another example, the person may be within the proximity threshold, but be located in a direction that is not within the coverage area of the relayed beamformed communications. In this situation, the relay node again returns to 305 and continues to perform the proximity detection procedure.

However, if the relay node determines that the person within the proximity threshold may violate the MPE requirement, at 320 the relay node may update the beamforming configuration it is currently using to perform relay operations for the beamformed communications between the first wireless node and the second wireless node. For example, the relay node may thus determine that a first beamforming configuration is to be updated. Generally, the first beamforming configuration may be the beamforming configuration currently being used by the relay node for beamformed communications relayed by the relay node between the first wireless node and the second wireless node using a first beam. Accordingly, the relay node may identify a second beamforming configuration to use for relaying the beamformed communications using a second transmit beam. Generally, the second transmit beam may have an exposure indicia that satisfies the MPE requirement. For example, the second beam associated with the second beamforming configuration (e.g., the updated beamforming configuration) may use a transmit power level, beamformed direction, beamform shape, etc., that eliminates or otherwise mitigates the RF exposure to the person to a degree such that the MPE requirement is satisfied.

In some aspects, the relay node may autonomously update the second beamforming configuration based on detecting the person within the proximity threshold/MPE limit violation. For example, the relay node may identify or otherwise determine the transmit power level, beamforming direction, beam shape, and the like, for the relayed beamformed communications in order to comport with the MPE requirements.

At 325, the relay node may optionally provide an indication to the control node that the beamformed communications being relayed by the relay node use the second beam (e.g., transmit beam and/or receive beam of the relay node) according to the second beamforming configuration. In some examples, the indication may simply provide an indication to the control node that the relay node has updated its beamforming configuration for the relaying operations. In other examples, the indication may include first information.

For example, this may include the relay node, triggered by detecting the person within the proximity threshold/MPE violation, providing the first information to the control node to be used to assist in determination of the second beamforming configuration. For example, the first information may include location/orientation information for the person (e.g., distance and/or direction of the person with respect to the relay node). The control node and/or relay node may identify, select, or otherwise determine the second beamforming configuration based on the distance/direction of the person with respect to the relay node.

In some examples, this may include the first information indicating a first transmit power level and/or a second transmit power level for the first/second beamforming configurations, respectively, first and/or second power headroom values for the first/second beamforming configurations, respectively, and the like. Accordingly, the relay node may indicate to the control node the transmit power levels, power headroom values, power back off values, and the like, or any combination thereof, which may be used when updating the current beamforming configuration to the second beamforming configuration.

In some examples, this may include the first information indicating a duty cycle associated with the first and/or second beamforming configurations. For example, the relay node may identify or otherwise determine the TDD configuration for the beamformed communications, which may be associated with a certain duty cycle of uplink-to-downlink, or vice versa, beamformed communications. The relay node may indicate the current duty cycle (e.g., the first duty cycle) and/or a requested duty cycle to be used for relaying the beamformed communications.

Accordingly and at 330, the relay node may relay the beamformed communications between the first wireless node and the second wireless node using the second beam in accordance with the second beamforming configuration. Accordingly, method 300 illustrates a non-limiting example where the relay node (e.g., a repeater/reflector) may autonomously and/or with the assistance of the control node/network, update its beamforming configuration for relayed beamformed communications to address exposure limits to the person nearby the relay node.

Figure 4:
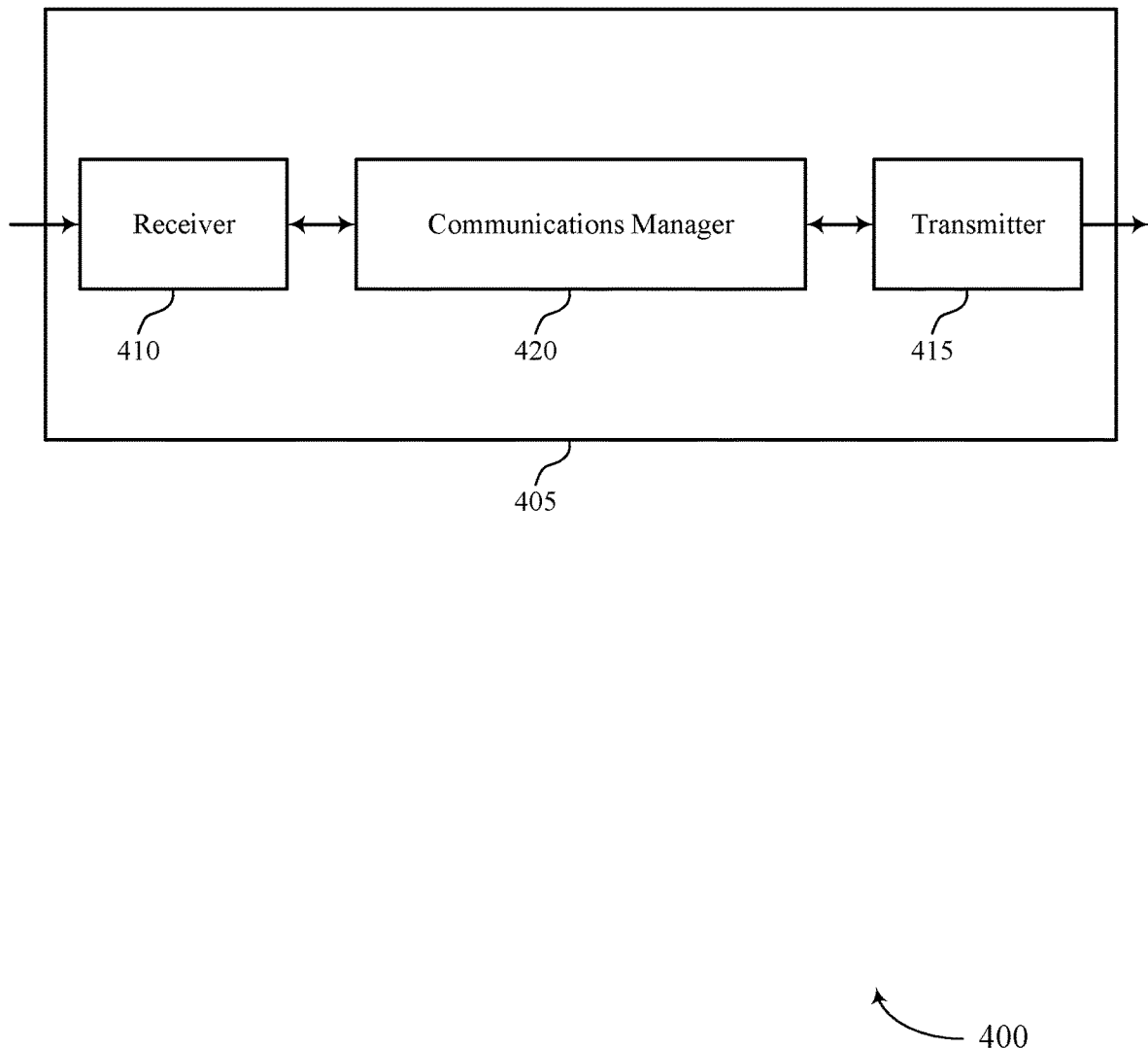
FIGS. 4 and 5 show block diagrams of devices that support MPE management of repeaters and reflectors in accordance with aspects of the present disclosure.

FIG. 4 shows a block diagram 400 of a device 405 that supports MPE management of repeaters and reflectors in accordance with aspects of the present disclosure. The device 405 may be an example of aspects of a base station 105 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to MPE management of repeaters and reflectors). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to MPE management of repeaters and reflectors). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of MPE management of repeaters and reflectors as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a relay node associated with a control node in accordance with examples as disclosed herein. For example, the communications manager 420 may be configured as or otherwise support a means for detecting that a person is within a proximity threshold of the relay node, the proximity threshold being associated with a MPE limit. The communications manager 420 may be configured as or otherwise support a means for determining, based on the detecting, that a first beamforming configuration is to be updated, the first beamforming configuration associated with beamformed communications relayed by the relay node between a first wireless node and a second wireless node using a first beam. The communications manager 420 may be configured as or otherwise support a means for identifying a second beamforming configuration for relay of the beamformed communications between the first wireless node and the second wireless node via a second beam having an exposure indicia that satisfies the MPE limit. The communications manager 420 may be configured as or otherwise support a means for relaying the beamformed communications between the first wireless node and the second wireless node using the second beam in accordance with the second beamforming configuration.

Additionally or alternatively, the communications manager 420 may support wireless communication at a control node in accordance with examples as disclosed herein. For example, the communications manager 420 may be configured as or otherwise support a means for receiving, from a relay node having a first beamforming configuration and associated with the control node, first information to assist in determination of a second beamforming configuration for the relay node, the receiving of the first information associated with the relay node detecting that a person is within a proximity threshold of the relay node, the proximity threshold being associated with a MPE limit and the first beamforming configuration being associated with beamformed communications relayed by the relay node between a first wireless node and a second wireless node using a first beam. The communications manager 420 may be configured as or otherwise support a means for identifying, based on the first information, the second beamforming configuration for relaying the beamformed communications between the first wireless node and the second wireless node via a second beam having an exposure indicia that satisfies the MPE limit at the relay node. The communications manager 420 may be configured as or otherwise support a means for providing to the relay node a second information associated with the second beamforming configuration according to the identifying.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for improving MPE requirement satisfaction at repeaters/reflectors performing relay operations of beamformed communications between a first wireless node and a second wireless node.

Figure 5:
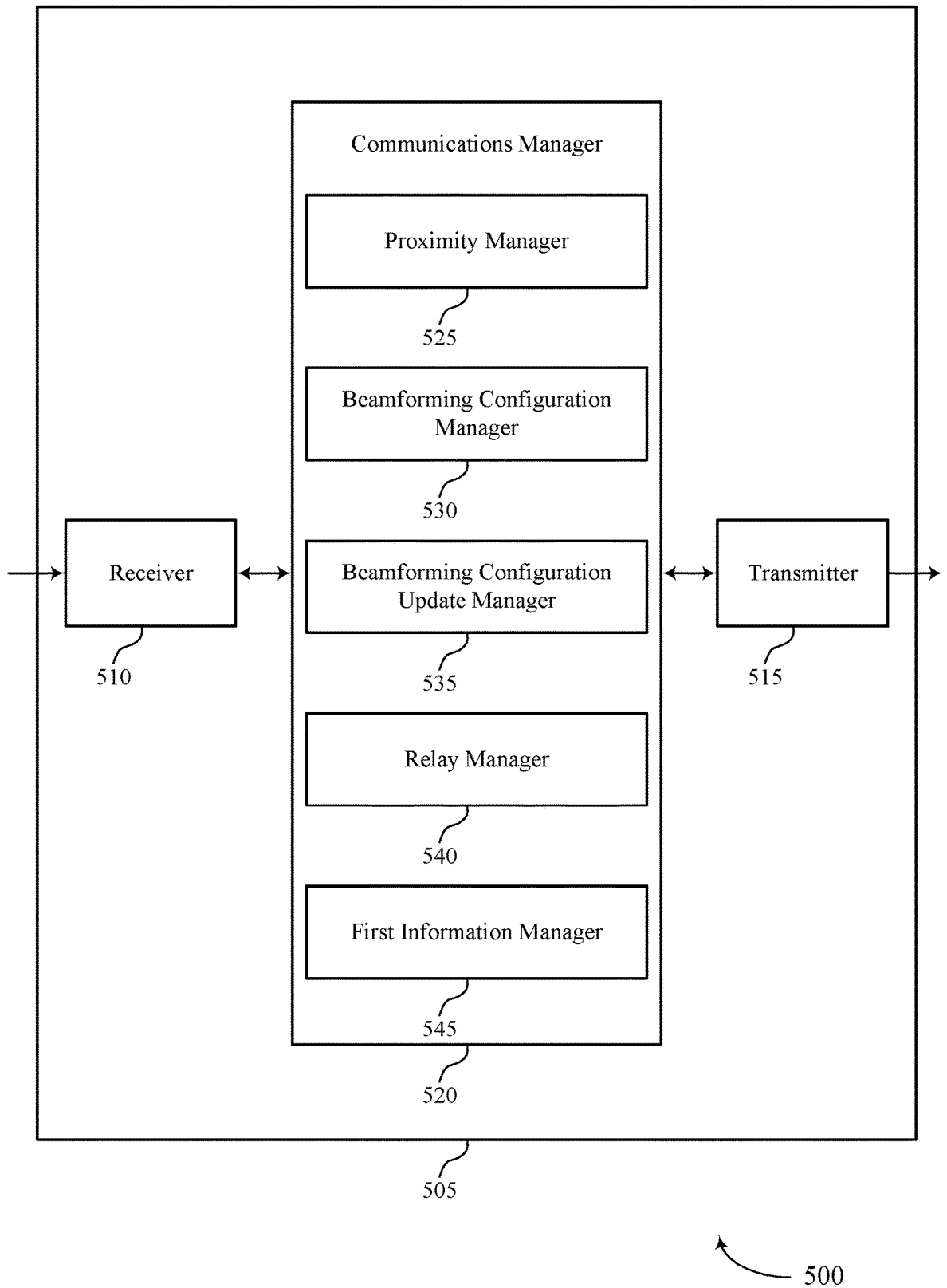

FIG. 5 shows a block diagram 500 of a device 505 that supports MPE management of repeaters and reflectors in accordance with aspects of the present disclosure. The device 505 may be an example of aspects of a device 405 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to MPE management of repeaters and reflectors). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to MPE management of repeaters and reflectors). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of MPE management of repeaters and reflectors as described herein. For example, the communications manager 520 may include a proximity manager 525, a beamforming configuration manager 530, a beamforming configuration update manager 535, a relay manager 540, a first information manager 545, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a relay node associated with a control node in accordance with examples as disclosed herein. The proximity manager 525 may be configured as or otherwise support a means for detecting that a person is within a proximity threshold of the relay node, the proximity threshold being associated with a MPE limit. The beamforming configuration manager 530 may be configured as or otherwise support a means for determining, based on the detecting, that a first beamforming configuration is to be updated, the first beamforming configuration associated with beamformed communications relayed by the relay node between a first wireless node and a second wireless node using a first beam. The beamforming configuration update manager 535 may be configured as or otherwise support a means for identifying a second beamforming configuration for relay of the beamformed communications between the first wireless node and the second wireless node via a second beam having an exposure indicia that satisfies the MPE limit. The relay manager 540 may be configured as or otherwise support a means for relaying the beamformed communications between the first wireless node and the second wireless node using the second beam in accordance with the second beamforming configuration.

Additionally or alternatively, the communications manager 520 may support wireless communication at a control node in accordance with examples as disclosed herein. The first information manager 545 may be configured as or otherwise support a means for receiving, from a relay node having a first beamforming configuration and associated with the control node, first information to assist in determination of a second beamforming configuration for the relay node, the receiving of the first information associated with the relay node detecting that a person is within a proximity threshold of the relay node, the proximity threshold being associated with a MPE limit and the first beamforming configuration being associated with beamformed communications relayed by the relay node between a first wireless node and a second wireless node using a first beam. The beamforming configuration update manager 535 may be configured as or otherwise support a means for identifying, based on the first information, the second beamforming configuration for relaying the beamformed communications between the first wireless node and the second wireless node via a second beam having an exposure indicia that satisfies the MPE limit at the relay node. The beamforming configuration update manager 535 may be configured as or otherwise support a means for providing to the relay node a second information associated with the second beamforming configuration according to the identifying.

Figure 6:
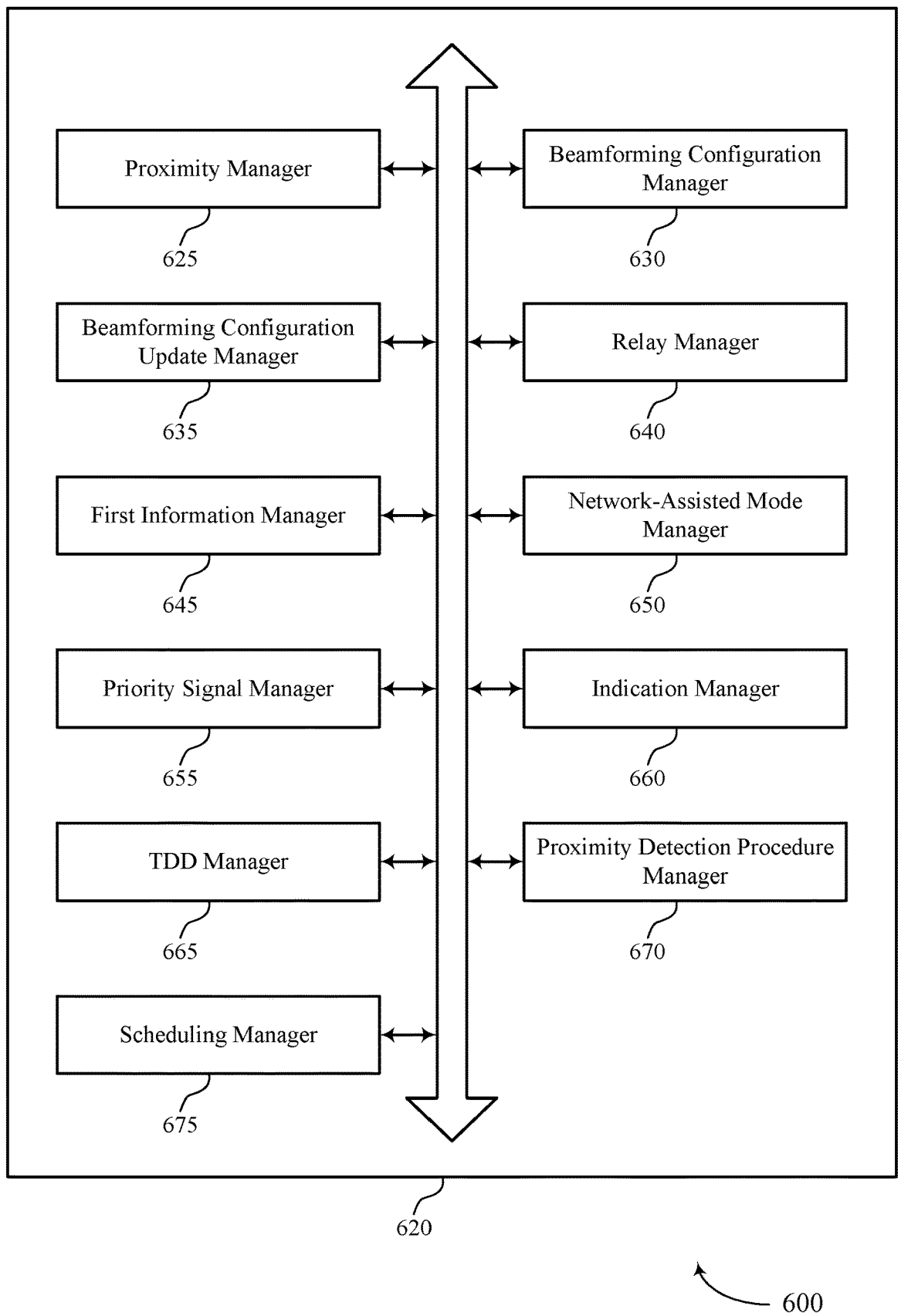
FIG. 6 shows a block diagram of a communications manager that supports MPE management of repeaters and reflectors in accordance with aspects of the present disclosure.

FIG. 6 shows a block diagram 600 of a communications manager 620 that supports MPE management of repeaters and reflectors in accordance with aspects of the present disclosure. The communications manager 620 may be an example of aspects of a communications manager 420, a communications manager 520, or both, as described herein. The communications manager 620, or various components thereof, may be an example of means for performing various aspects of MPE management of repeaters and reflectors as described herein. For example, the communications manager 620 may include a proximity manager 625, a beamforming configuration manager 630, a beamforming configuration update manager 635, a relay manager 640, a first information manager 645, a network-assisted mode manager 650, a priority signal manager 655, an indication manager 660, a TDD manager 665, a proximity detection procedure manager 670, a scheduling manager 675, or any combination thereof. Each of these components may communicate, directly or indirectly, with one another (e.g., via one or more buses).

The communications manager 620 may support wireless communication at a relay node associated with a control node in accordance with examples as disclosed herein. The proximity manager 625 may be configured as or otherwise support a means for detecting that a person is within a proximity threshold of the relay node, the proximity threshold being associated with a MPE limit. The beamforming configuration manager 630 may be configured as or otherwise support a means for determining, based on the detecting, that a first beamforming configuration is to be updated, the first beamforming configuration associated with beamformed communications relayed by the relay node between a first wireless node and a second wireless node using a first beam. The beamforming configuration update manager 635 may be configured as or otherwise support a means for identifying a second beamforming configuration for relay of the beamformed communications between the first wireless node and the second wireless node via a second beam having an exposure indicia that satisfies the MPE limit. The relay manager 640 may be configured as or otherwise support a means for relaying the beamformed communications between the first wireless node and the second wireless node using the second beam in accordance with the second beamforming configuration.

In some examples, the network-assisted mode manager 650 may be configured as or otherwise support a means for providing to the control node and triggered by the detecting that the person is within the proximity threshold of the relay node, a first information to assist in determination of the second beamforming configuration. In some examples, the first information includes a distance of the person from the relay node, a direction of the person from the relay node, or both. In some examples, the first information includes a first transmit power of the first beamforming configuration, a second transmit power of the second beamforming configuration, a first power headroom value of the first beamforming configuration, a second power headroom value of the second beamforming configuration, or a combination thereof.

In some examples, the first information includes a first duty cycle of the first beamforming configuration, a second duty cycle of the second beamforming configuration, or both. In some examples, the first information includes a first request to perform the beamformed communications using the second beam, a second request for a receive beam of the second wireless node (and/or the first wireless node) to use for the beamformed communications, a change request for a TCI state for the beamformed communications, or a combination thereof.

In some examples, the network-assisted mode manager 650 may be configured as or otherwise support a means for obtaining, responsive to the first information, second information associated with the second beamforming configuration. In some examples, the second information associated with the second beamforming configuration includes a maximum transmit power level for the second beamforming configuration, a duty cycle for a beamforming direction using the second beamforming configuration, the second beamforming configuration, or a combination thereof.

In some examples, the priority signal manager 655 may be configured as or otherwise support a means for determining that a priority level of a signal associated with the first beamforming configuration satisfies a priority threshold, where the second beamforming configuration is based on the priority level of the signal satisfying the priority threshold. In some examples, the second beamforming configuration maintains a transmit power of the signal based on the priority level of the signal satisfying the priority threshold. In some examples, the signal includes at least one of an SSB, a CSI-RS, or both.

In some examples, the indication manager 660 may be configured as or otherwise support a means for providing to the control node an indication that the relay node is relaying the beamformed communications between the first wireless node and the second wireless node using the second beam.

In some examples, the TDD manager 665 may be configured as or otherwise support a means for identifying a TDD configuration for the beamformed communications, where the second beamforming configuration is based on the TDD configuration.

In some examples, the proximity detection procedure manager 670 may be configured as or otherwise support a means for performing a proximity detection procedure to detect whether the person is within the proximity threshold of the relay node using one or more proximity detection sensors. In some examples, the proximity detection procedure is performed on per-beam basis, on a per-beamforming configuration basis, on a per-active beam configuration basis, on a per-requested beam basis, on a per-beamforming direction basis, or a combination thereof. In some examples, the relay node includes a repeater associated with the control node or a reflector associated with the control node.

Additionally or alternatively, the communications manager 620 may support wireless communication at a control node in accordance with examples as disclosed herein. The first information manager 645 may be configured as or otherwise support a means for receiving, from a relay node having a first beamforming configuration and associated with the control node, first information to assist in determination of a second beamforming configuration for the relay node, the receiving of the first information associated with the relay node detecting that a person is within a proximity threshold of the relay node, the proximity threshold being associated with a MPE limit and the first beamforming configuration being associated with beamformed communications relayed by the relay node between a first wireless node and a second wireless node using a first beam. In some examples, the beamforming configuration update manager 635 may be configured as or otherwise support a means for identifying, based on the first information, the second beamforming configuration for relaying the beamformed communications between the first wireless node and the second wireless node via a second beam having an exposure indicia that satisfies the MPE limit at the relay node. In some examples, the beamforming configuration update manager 635 may be configured as or otherwise support a means for providing to the relay node a second information associated with the second beamforming configuration according to the identifying.

In some examples, the scheduling manager 675 may be configured as or otherwise support a means for identifying one or more scheduling configurations for the beamformed communications using the second beam according to the second beamforming configuration based on the first information provided by the relay node to assist in determination of the second beamforming configuration.

In some examples, the priority signal manager 655 may be configured as or otherwise support a means for determining that a priority level of a signal associated with the first beamforming configuration satisfies a priority threshold, where the second beamforming configuration is based on the priority level of the signal satisfying the priority threshold. In some examples, the second beamforming configuration maintains a transmit power of the signal based on the priority level of the signal satisfying the priority threshold. In some examples, the signal includes at least one of a synchronization signal block, a channel state information reference signal, or both.

In some examples, the indication manager 660 may be configured as or otherwise support a means for obtaining from the relay node an indication that the relay node is relaying the beamformed communications between the first wireless node and the second wireless node using the second beam.

In some examples, the network-assisted mode manager 650 may be configured as or otherwise support a means for providing, to a network entity, the first information provided by the relay node to assist in determination of the second beamforming configuration. In some examples, the network-assisted mode manager 650 may be configured as or otherwise support a means for obtaining, from the network entity, an indication of the second beamforming configuration based on providing the first information to the network entity.

In some examples, the first information provided by the relay node to assist in determination of the second beamforming configuration includes a distance of the person from the relay node, a direction of the person from the relay node, the first beamforming configuration, the second beamforming configuration, a first transmit power of the first beamforming configuration, a second transmit power of the second beamforming configuration, a first duty cycle of the first beamforming configuration, a second duty cycle of the second beamforming configuration, a first request to perform the beamformed communications using the second beam, a second request for a receive beam of the second wireless node (and/or the first wireless node) to use for the beamformed communications, a change request for a TCI state for the beamformed communications, or a combination thereof.

In some examples, the second information associated with the second beamforming configuration includes a maximum transmit power level for the second beamforming configuration, a duty cycle for a beamforming direction using the second beamforming configuration, the second beamforming configuration, a reflector coefficient of a reflection pattern associated with the second beam, or a combination thereof. In some examples, the control node includes a base station or a UE.

Figure 7:
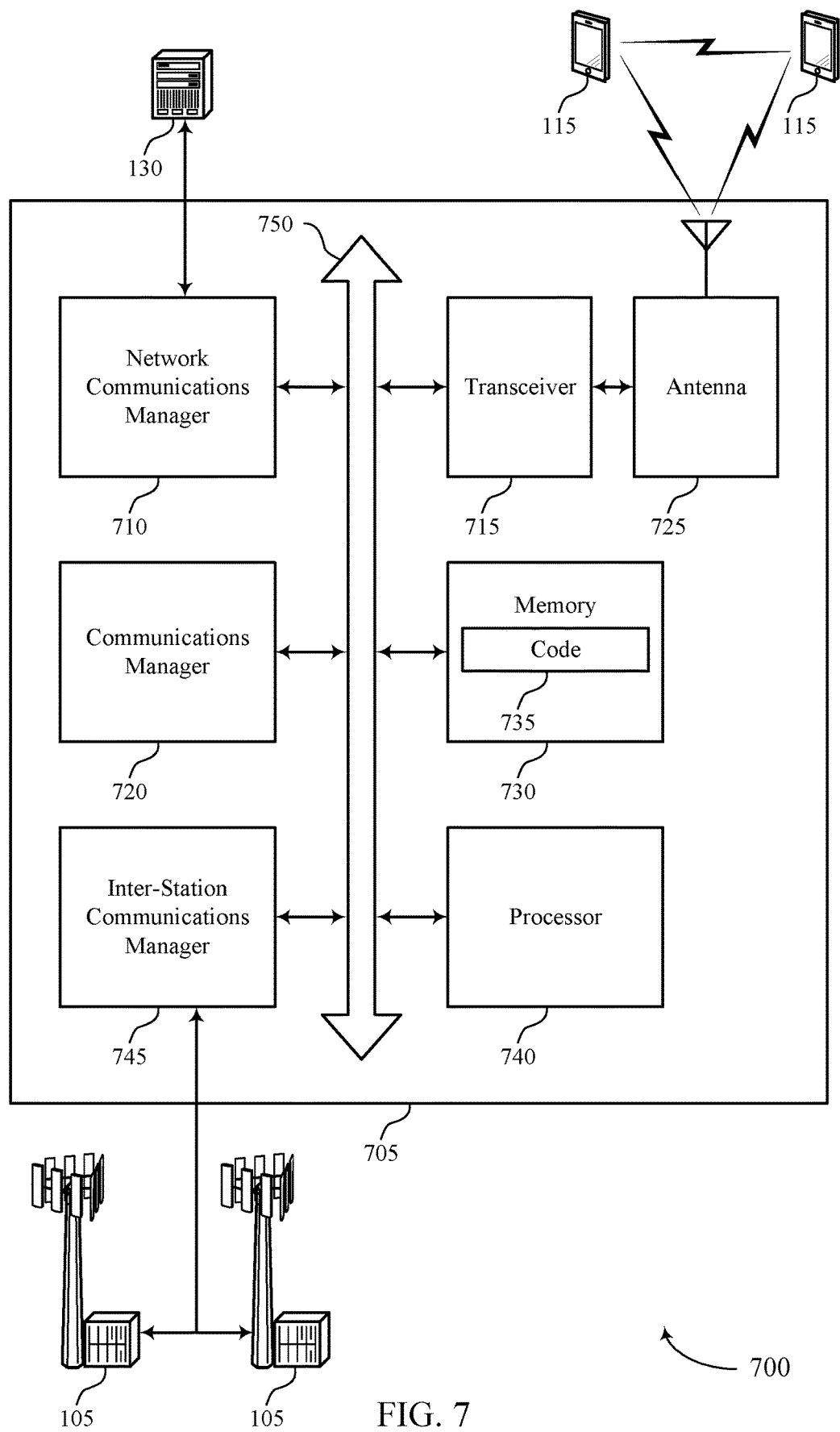
FIG. 7 shows a diagram of a system including a device that supports MPE management of repeaters and reflectors in accordance with aspects of the present disclosure.

FIG. 7 shows a diagram of a system 700 including a device 705 that supports MPE management of repeaters and reflectors in accordance with aspects of the present disclosure. The device 705 may be an example of or include the components of a device 405, a device 505, or a base station 105 as described herein. The device 705 may communicate wirelessly with one or more base stations 105, UEs 115, or any combination thereof. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-station communications manager 745. These components may be in electronic communication or otherwise coupled (e.g., operatively, communicatively, functionally, electronically, electrically) via one or more buses (e.g., a bus 750).

The network communications manager 710 may manage communications with a core network 130 (e.g., via one or more wired backhaul links). For example, the network communications manager 710 may manage the transfer of data communications for client devices, such as one or more UEs 115.

In some cases, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include RAM and ROM. The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a BIOS which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting MPE management of repeaters and reflectors). For example, the device 705 or a component of the device 705 may include a processor 740 and memory 730 coupled to the processor 740, the processor 740 and memory 730 configured to perform various functions described herein.

The inter-station communications manager 745 may manage communications with other base stations 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communications network technology to provide communication between base stations 105.

The communications manager 720 may support wireless communication at a relay node associated with a control node in accordance with examples as disclosed herein. For example, the communications manager 720 may be configured as or otherwise support a means for detecting that a person is within a proximity threshold of the relay node, the proximity threshold being associated with a MPE limit. The communications manager 720 may be configured as or otherwise support a means for determining, based on the detecting, that a first beamforming configuration is to be updated, the first beamforming configuration associated with beamformed communications relayed by the relay node between a first wireless node and a second wireless node using a first beam. The communications manager 720 may be configured as or otherwise support a means for identifying a second beamforming configuration for relay of the beamformed communications between the first wireless node and the second wireless node via a second beam having an exposure indicia that satisfies the MPE limit. The communications manager 720 may be configured as or otherwise support a means for relaying the beamformed communications between the first wireless node and the second wireless node using the second beam in accordance with the second beamforming configuration.

Additionally or alternatively, the communications manager 720 may support wireless communication at a control node in accordance with examples as disclosed herein. For example, the communications manager 720 may be configured as or otherwise support a means for receiving, from a relay node having a first beamforming configuration and associated with the control node, first information to assist in determination of a second beamforming configuration for the relay node, the receiving of the first information associated with the relay node detecting that a person is within a proximity threshold of the relay node, the proximity threshold being associated with a MPE limit and the first beamforming configuration being associated with beamformed communications relayed by the relay node between a first wireless node and a second wireless node using a first beam. The communications manager 720 may be configured as or otherwise support a means for identifying, based on the first information, the second beamforming configuration for relaying the beamformed communications between the first wireless node and a second wireless node via a second beam having an exposure indicia that satisfies the MPE limit at the relay node. The communications manager 720 may be configured as or otherwise support a means for providing to the relay node a second information associated with the second beamforming configuration according to the identifying.

By including or configuring the communications manager 720 in accordance with examples as described herein, the device 705 may support techniques for improving MPE requirement satisfaction at repeaters/reflectors performing relay operations of beamformed communications between a first wireless node and a second wireless node.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of MPE management of repeaters and reflectors as described herein, or the processor 740 and the memory 730 may be otherwise configured to perform or support such operations.

Figure 8:
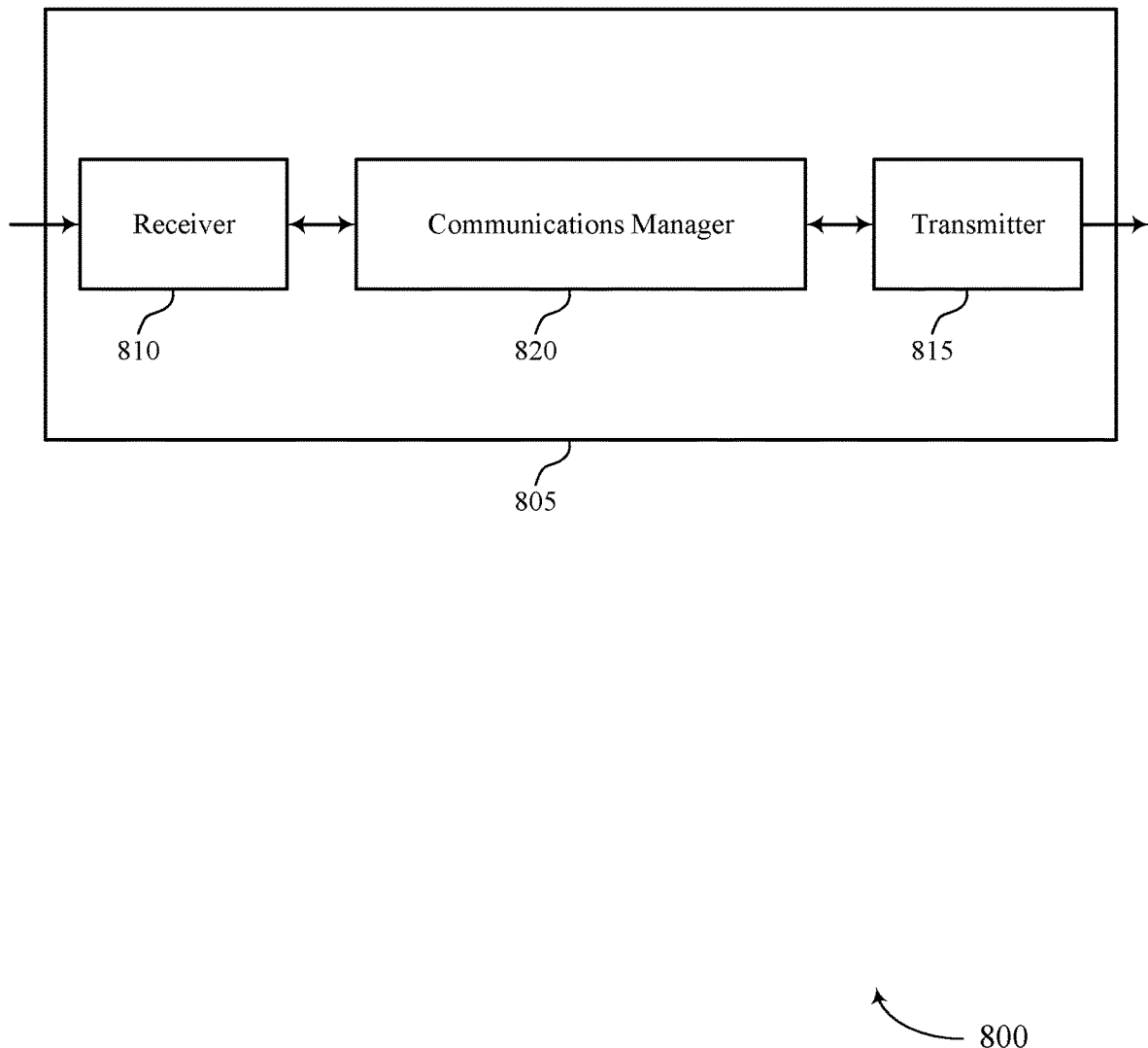
FIGS. 8 and 9 show block diagrams of devices that support MPE management of repeaters and reflectors in accordance with aspects of the present disclosure.

FIG. 8 shows a block diagram 800 of a device 805 that supports MPE management of repeaters and reflectors in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to MPE management of repeaters and reflectors). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to MPE management of repeaters and reflectors). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of MPE management of repeaters and reflectors as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a control node in accordance with examples as disclosed herein. For example, the communications manager 820 may be configured as or otherwise support a means for receiving, from a relay node having a first beamforming configuration and associated with the control node, first information to assist in determination of a second beamforming configuration for the relay node, the receiving of the first information associated with the relay node detecting that a person is within a proximity threshold of the relay node, the proximity threshold being associated with a MPE limit and the first beamforming configuration being associated with beamformed communications relayed by the relay node between a first wireless node and a second wireless node using a first beam. The communications manager 820 may be configured as or otherwise support a means for identifying, based on the first information, the second beamforming configuration for relaying the beamformed communications between the first wireless node and the second wireless node via a second beam having an exposure indicia that satisfies the MPE limit at the relay node. The communications manager 820 may be configured as or otherwise support a means for providing to the relay node a second information associated with the second beamforming configuration according to the identifying.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for improving MPE requirement satisfaction at repeaters/reflectors performing relay operations of beamformed communications between a first wireless node and a second wireless node.

Figure 9:
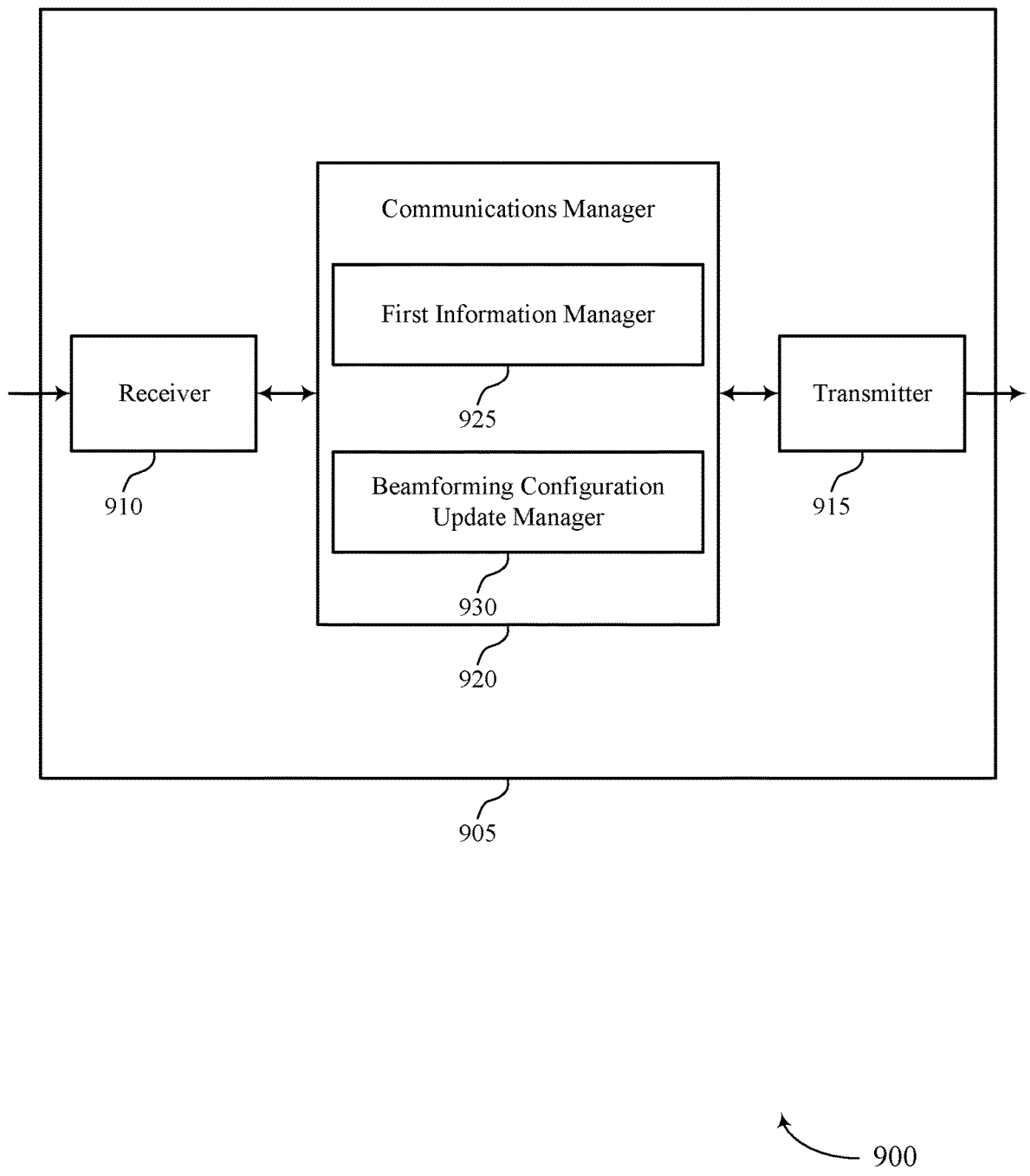

FIG. 9 shows a block diagram 900 of a device 905 that supports MPE management of repeaters and reflectors in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to MPE management of repeaters and reflectors). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to MPE management of repeaters and reflectors). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of MPE management of repeaters and reflectors as described herein. For example, the communications manager 920 may include a first information manager 925 a beamforming configuration update manager 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a control node in accordance with examples as disclosed herein. The first information manager 925 may be configured as or otherwise support a means for receiving, from a relay node having a first beamforming configuration and associated with the control node, first information to assist in determination of a second beamforming configuration for the relay node, the receiving of the first information associated with the relay node detecting that a person is within a proximity threshold of the relay node, the proximity threshold being associated with a MPE limit and the first beamforming configuration being associated with beamformed communications relayed by the relay node between a first wireless node and a second wireless node using a first beam. The beamforming configuration update manager 930 may be configured as or otherwise support a means for identifying, based on the first information, the second beamforming configuration for relaying the beamformed communications between the first wireless node and the second wireless node via a second beam having an exposure indicia that satisfies the MPE limit at the relay node. The beamforming configuration update manager 930 may be configured as or otherwise support a means for providing to the relay node a second information associated with the second beamforming configuration according to the identifying.

Figure 10:
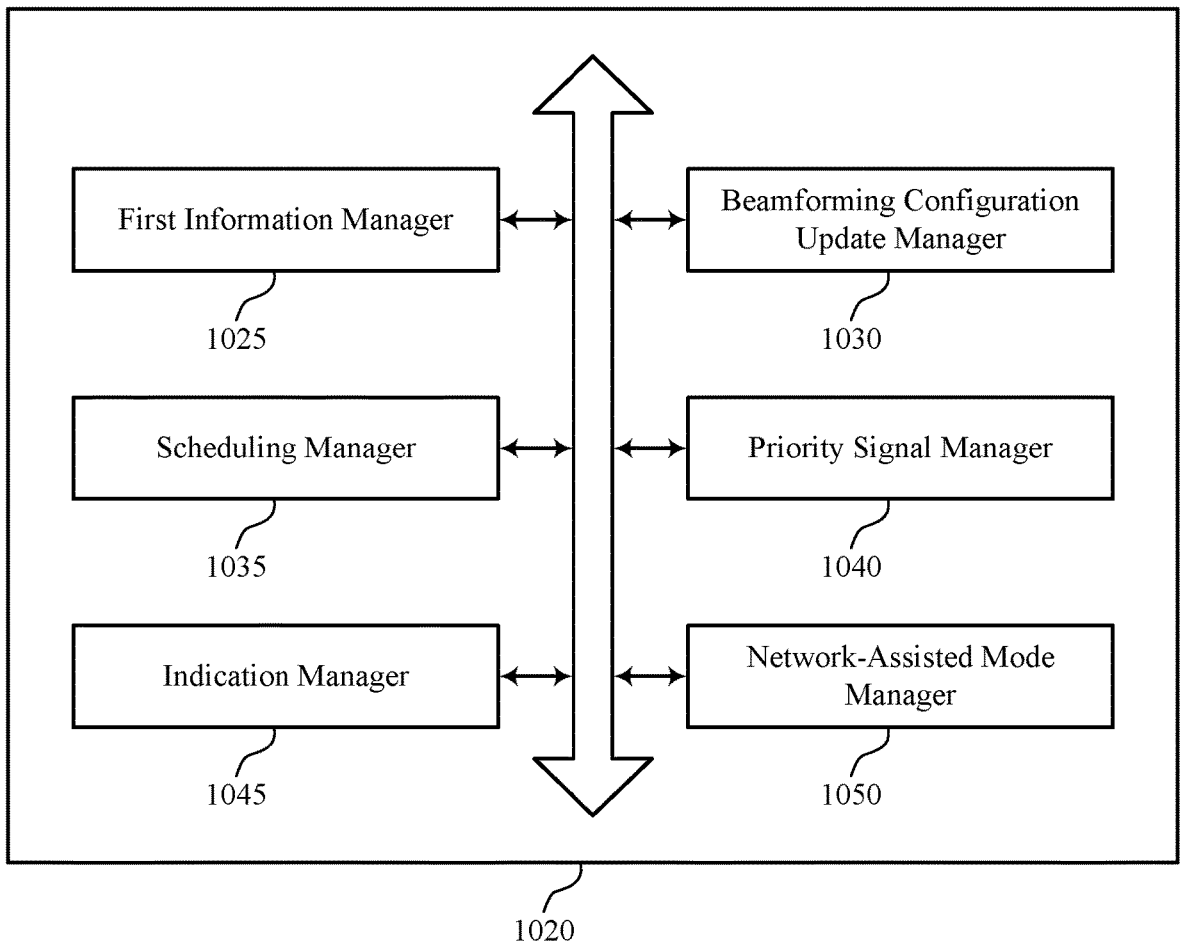
FIG. 10 shows a block diagram of a communications manager that supports MPE management of repeaters and reflectors in accordance with aspects of the present disclosure.

FIG. 10 shows a block diagram 1000 of a communications manager 1020 that supports MPE management of repeaters and reflectors in accordance with aspects of the present disclosure. The communications manager 1020 may be an example of aspects of a communications manager 820, a communications manager 920, or both, as described herein. The communications manager 1020, or various components thereof, may be an example of means for performing various aspects of MPE management of repeaters and reflectors as described herein. For example, the communications manager 1020 may include a first information manager 1025, a beamforming configuration update manager 1030, a scheduling manager 1035, a priority signal manager 1040, an indication manager 1045, a network-assisted mode manager 1050, or any combination thereof. Each of these components may communicate, directly or indirectly, with one another (e.g., via one or more buses).

The communications manager 1020 may support wireless communication at a control node in accordance with examples as disclosed herein. The first information manager 1025 may be configured as or otherwise support a means for receiving, from a relay node having a first beamforming configuration and associated with the control node, first information to assist in determination of a second beamforming configuration for the relay node, the receiving of the first information associated with the relay node detecting that a person is within a proximity threshold of the relay node, the proximity threshold being associated with a MPE limit and the first beamforming configuration being associated with beamformed communications relayed by the relay node between a first wireless node and a second wireless node using a first beam. The beamforming configuration update manager 1030 may be configured as or otherwise support a means for identifying, based on the first information, the second beamforming configuration for relaying the beamformed communications between the first wireless node and the second wireless node via a second beam having an exposure indicia that satisfies the MPE limit at the relay node. In some examples, the beamforming configuration update manager 1030 may be configured as or otherwise support a means for providing to the relay node a second information associated with the second beamforming configuration according to the identifying.

In some examples, the scheduling manager 1035 may be configured as or otherwise support a means for identifying one or more scheduling configurations for the beamformed communications using the second beam according to the second beamforming configuration based on the first information provided by the relay node to assist in determination of the second beamforming configuration.

In some examples, the priority signal manager 1040 may be configured as or otherwise support a means for determining that a priority level of a signal associated with the first beamforming configuration satisfies a priority threshold, where the second beamforming configuration is based on the priority level of the signal satisfying the priority threshold. In some examples, the second beamforming configuration maintains a transmit power of the signal based on the priority level of the signal satisfying the priority threshold. In some examples, the signal includes at least one of an SSB, a CSI-RS, or both.

In some examples, the indication manager 1045 may be configured as or otherwise support a means for obtaining from the relay node an indication that the relay node is relaying the beamformed communications between the first wireless node and the second wireless node using the second beam.

In some examples, the network-assisted mode manager 1050 may be configured as or otherwise support a means for providing, to a network entity, the first information provided by the relay node to assist in determination of the second beamforming configuration. In some examples, the network-assisted mode manager 1050 may be configured as or otherwise support a means for obtaining, from the network entity, an indication of the second beamforming configuration based on providing the first information to the network entity.

In some examples, the first information provided by the relay node to assist in determination of the second beamforming configuration includes a distance of the person from the relay node, a direction of the person from the relay node, the first beamforming configuration, the second beamforming configuration, a first transmit power of the first beamforming configuration, a second transmit power of the second beamforming configuration, a first duty cycle of the first beamforming configuration, a second duty cycle of the second beamforming configuration, a first request to perform the beamformed communications using the second beam, a second request for a receive beam of the second wireless node (and/or the first wireless node) to use for the beamformed communications, a change request for a TCI state for the beamformed communications, or a combination thereof.

In some examples, the second information associated with the second beamforming configuration includes a maximum transmit power level for the second beamforming configuration, a duty cycle for a beamforming direction using the second beamforming configuration, the second beamforming configuration, a reflector coefficient of a reflection pattern associated with the second beam, or a combination thereof. In some examples, the control node includes a base station or a UE.

Figure 11:
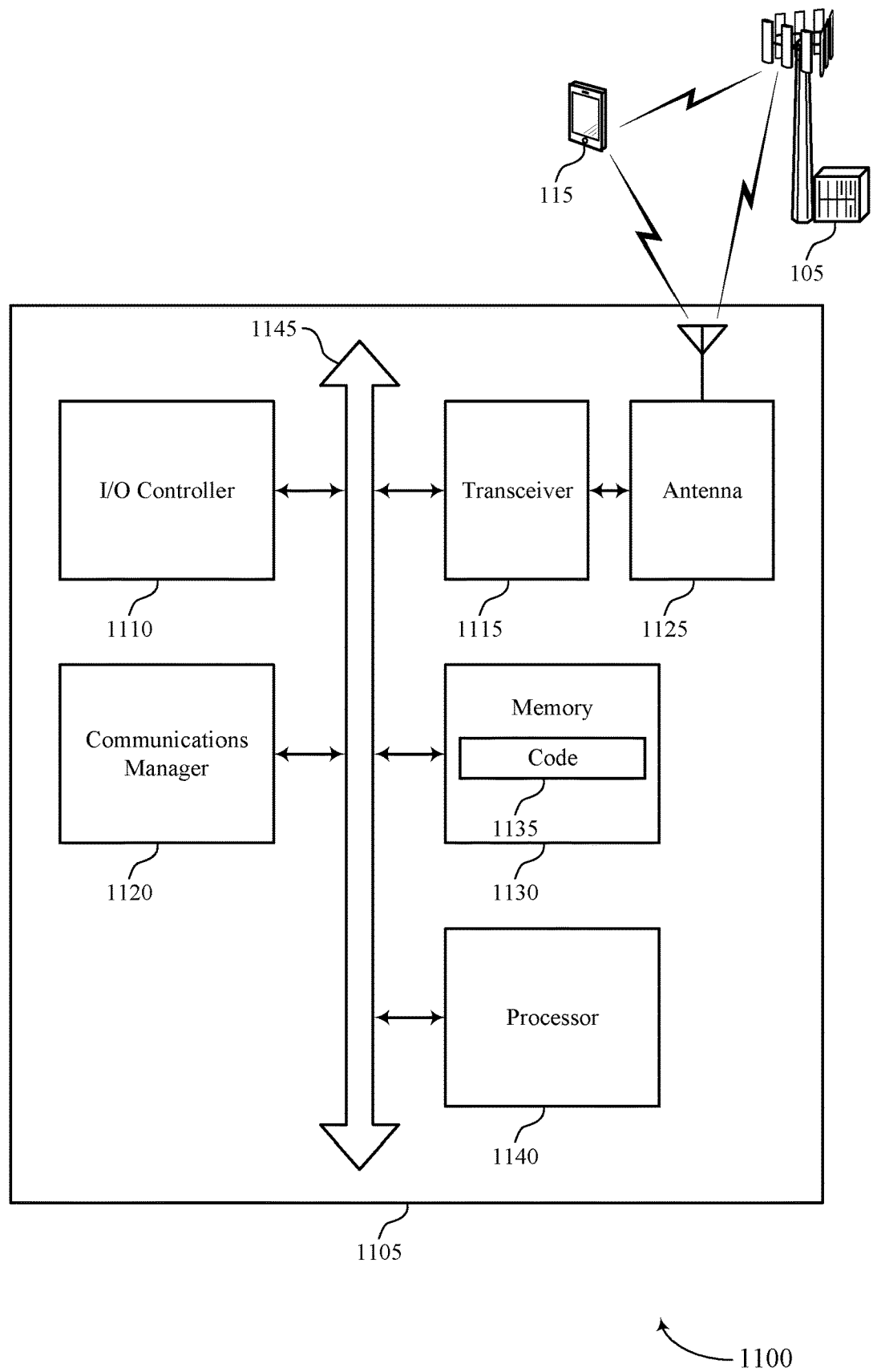
FIG. 11 shows a diagram of a system including a device that supports MPE management of repeaters and reflectors in accordance with aspects of the present disclosure.

FIG. 11 shows a diagram of a system 1100 including a device 1105 that supports MPE management of repeaters and reflectors in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting MPE management of repeaters and reflectors). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a control node in accordance with examples as disclosed herein. For example, the communications manager 1120 may be configured as or otherwise support a means for receiving, from a relay node having a first beamforming configuration and associated with the control node, first information to assist in determination of a second beamforming configuration for the relay node, the receiving of the first information associated with the relay node detecting that a person is within a proximity threshold of the relay node, the proximity threshold being associated with a MPE limit and the first beamforming configuration being associated with beamformed communications relayed by the relay node between a first wireless node and a second wireless node using a first beam. The communications manager 1120 may be configured as or otherwise support a means for identifying, based on the first information, the second beamforming configuration for relaying the beamformed communications between the first wireless node and the second wireless node via a second beam having an exposure indicia that satisfies the MPE limit at the relay node. The communications manager 1120 may be configured as or otherwise support a means for providing to the relay node a second information associated with the second beamforming configuration according to the identifying.

By including or configuring the communications manager 1120 in accordance with examples as described herein, the device 1105 may support techniques for improving MPE requirement satisfaction at repeaters/reflectors performing relay operations of beamformed communications between a first wireless node and a second wireless node.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of MPE management of repeaters and reflectors as described herein, or the processor 1140 and the memory 1130 may be otherwise configured to perform or support such operations.

Figure 12:
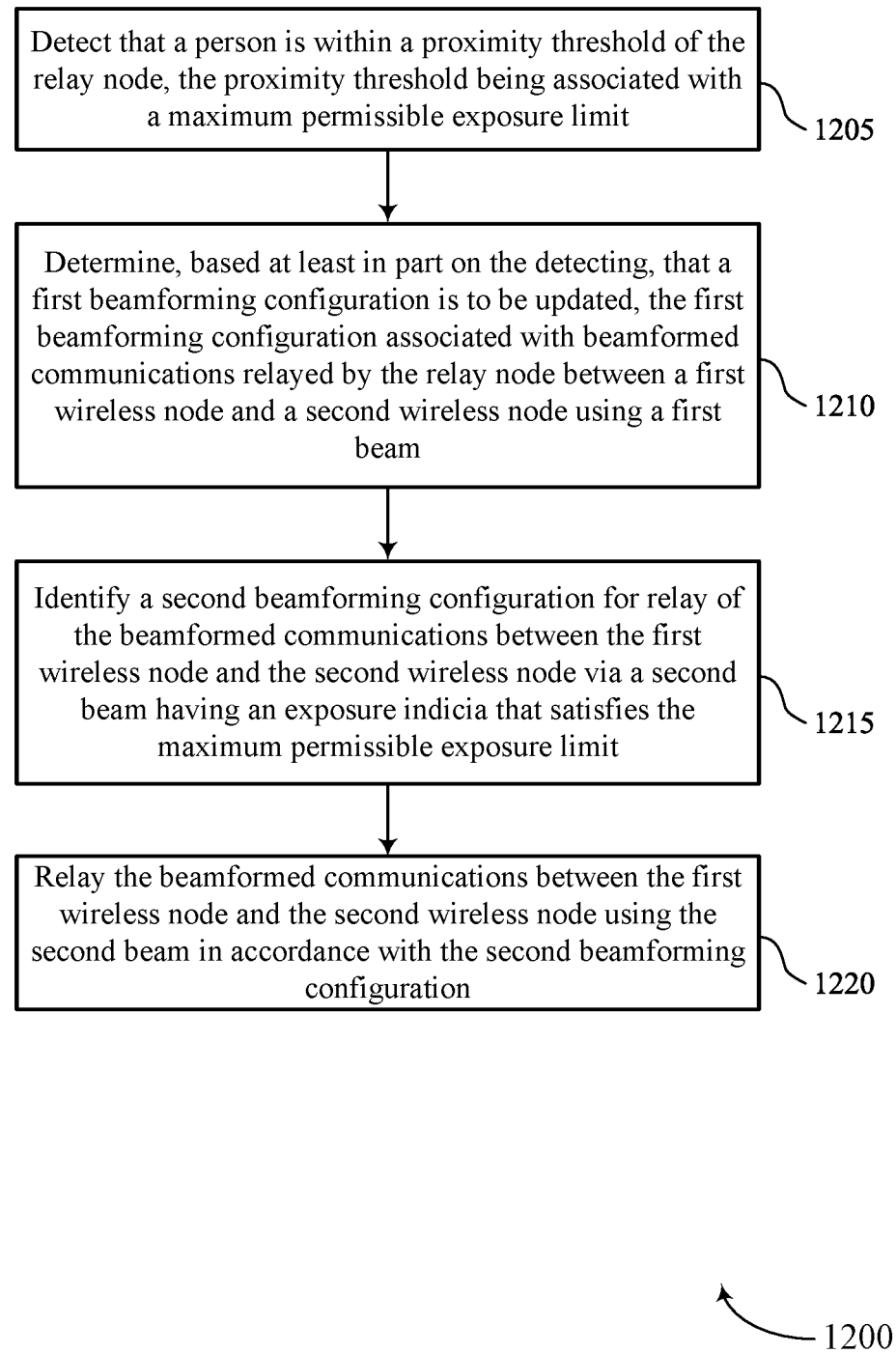
FIGS. 12 through 16 show flowcharts illustrating methods that support MPE management of repeaters and reflectors in accordance with aspects of the present disclosure.

FIG. 12 shows a flowchart illustrating a method 1200 that supports MPE management of repeaters and reflectors in accordance with aspects of the present disclosure. The operations of the method 1200 may be implemented by a base station or its components as described herein. For example, the operations of the method 1200 may be performed by a base station 105 as described with reference to FIGS. 1 through 7. In some examples, a base station may execute a set of instructions to control the functional elements of the base station to perform the described functions. Additionally or alternatively, the base station may perform aspects of the described functions using special-purpose hardware.

At 1205, the method may include detecting that a person is within a proximity threshold of the relay node, the proximity threshold being associated with a MPE limit. The operations of 1205 may be performed in accordance with examples as disclosed herein. In some examples, aspects of the operations of 1205 may be performed by a proximity manager 625 as described with reference to FIG. 6.

At 1210, the method may include determining, based on the detecting, that a first beamforming configuration is to be updated, the first beamforming configuration associated with beamformed communications relayed by the relay node between a first wireless node and a second wireless node using a first beam. The operations of 1210 may be performed in accordance with examples as disclosed herein. In some examples, aspects of the operations of 1210 may be performed by a beamforming configuration manager 630 as described with reference to FIG. 6.

At 1215, the method may include identifying a second beamforming configuration for relay of the beamformed communications between the first wireless node and the second wireless node via a second beam having an exposure indicia that satisfies the MPE limit. The operations of 1215 may be performed in accordance with examples as disclosed herein. In some examples, aspects of the operations of 1215 may be performed by a beamforming configuration update manager 635 as described with reference to FIG. 6.

At 1220, the method may include relaying the beamformed communications between the first wireless node and the second wireless node using the second beam in accordance with the second beamforming configuration. The operations of 1220 may be performed in accordance with examples as disclosed herein. In some examples, aspects of the operations of 1220 may be performed by a relay manager 640 as described with reference to FIG. 6.

Figure 13:
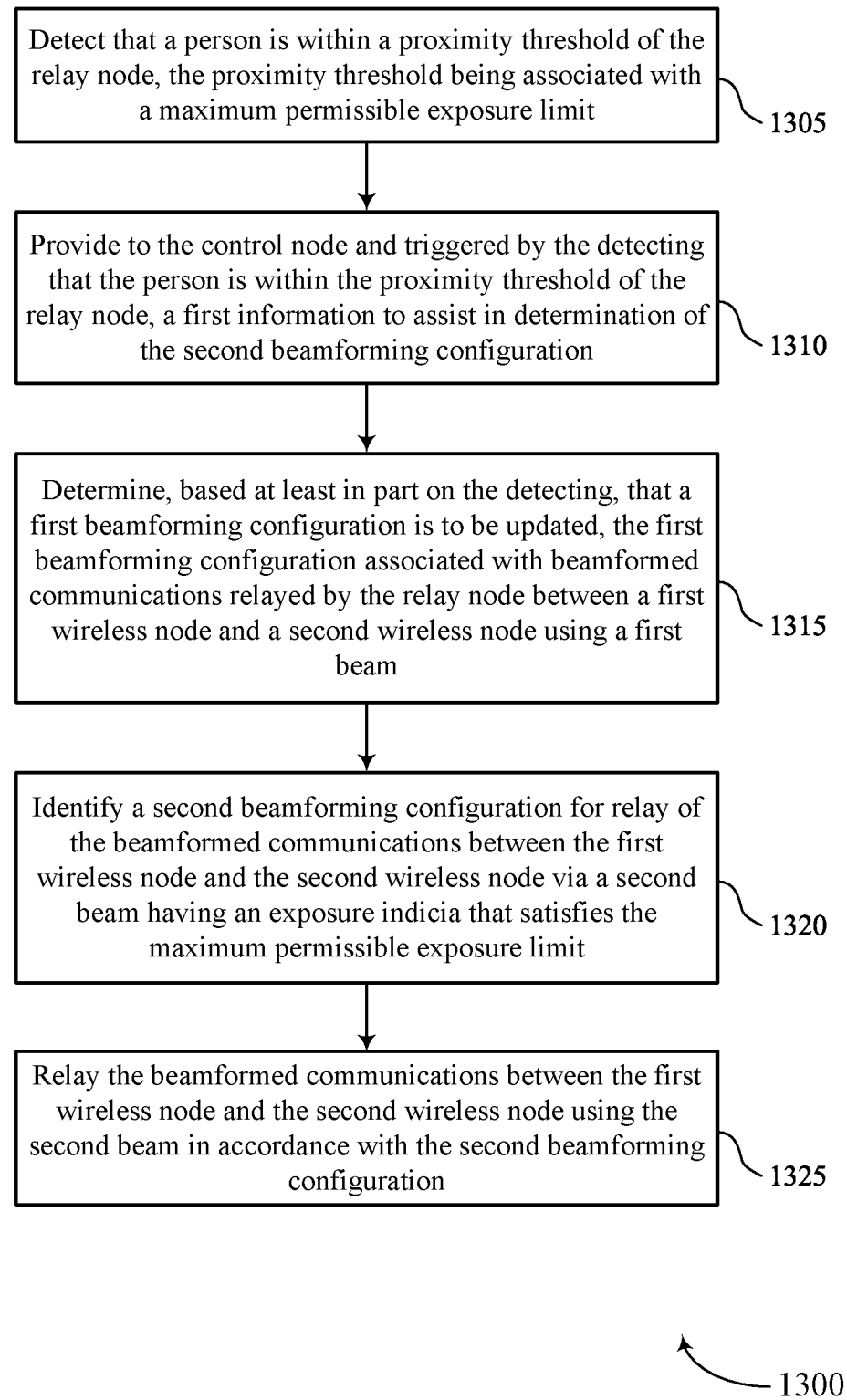

FIG. 13 shows a flowchart illustrating a method 1300 that supports MPE management of repeaters and reflectors in accordance with aspects of the present disclosure. The operations of the method 1300 may be implemented by a base station or its components as described herein. For example, the operations of the method 1300 may be performed by a base station 105 as described with reference to FIGS. 1 through 7. In some examples, a base station may execute a set of instructions to control the functional elements of the base station to perform the described functions. Additionally or alternatively, the base station may perform aspects of the described functions using special-purpose hardware.

At 1305, the method may include detecting that a person is within a proximity threshold of the relay node, the proximity threshold being associated with a MPE limit. The operations of 1305 may be performed in accordance with examples as disclosed herein. In some examples, aspects of the operations of 1305 may be performed by a proximity manager 625 as described with reference to FIG. 6.

At 1310, the method may include providing to the control node and triggered by the detecting that the person is within the proximity threshold of the relay node, a first information to assist in determination of the second beamforming configuration. The operations of 1310 may be performed in accordance with examples as disclosed herein. In some examples, aspects of the operations of 1310 may be performed by a network-assisted mode manager 650 as described with reference to FIG. 6.

At 1315, the method may include determining, based on the detecting, that a first beamforming configuration is to be updated, the first beamforming configuration associated with beamformed communications relayed by the relay node between a first wireless node and a second wireless node using a first beam. The operations of 1315 may be performed in accordance with examples as disclosed herein. In some examples, aspects of the operations of 1315 may be performed by a beamforming configuration manager 630 as described with reference to FIG. 6.

At 1320, the method may include identifying a second beamforming configuration for relay of the beamformed communications between the first wireless node and the second wireless node via a second beam having an exposure indicia that satisfies the MPE limit. The operations of 1320 may be performed in accordance with examples as disclosed herein. In some examples, aspects of the operations of 1320 may be performed by a beamforming configuration update manager 635 as described with reference to FIG. 6.

At 1325, the method may include relaying the beamformed communications between the first wireless node and the second wireless node using the second beam in accordance with the second beamforming configuration. The operations of 1325 may be performed in accordance with examples as disclosed herein. In some examples, aspects of the operations of 1325 may be performed by a relay manager 640 as described with reference to FIG. 6.

Figure 14:
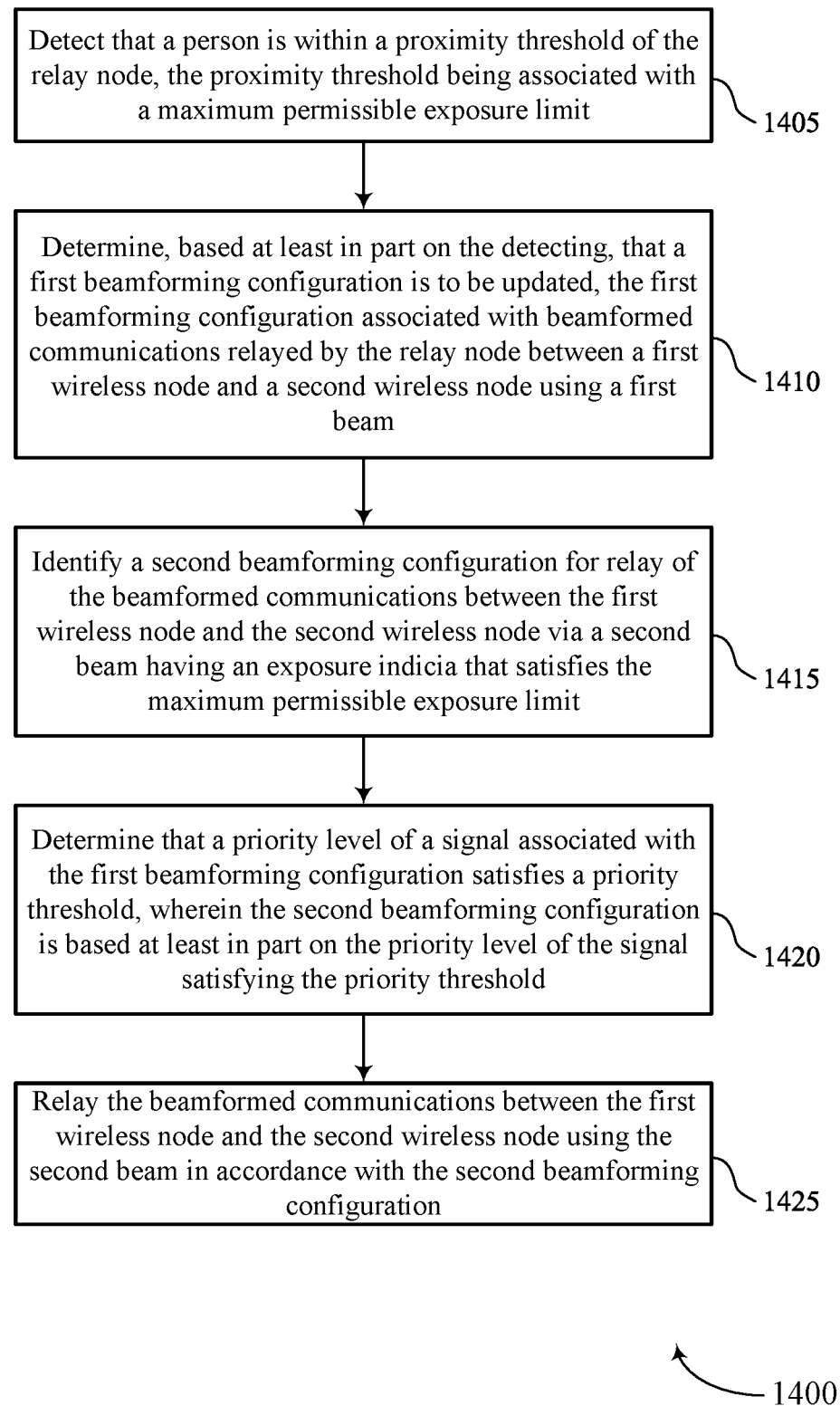

FIG. 14 shows a flowchart illustrating a method 1400 that supports MPE management of repeaters and reflectors in accordance with aspects of the present disclosure. The operations of the method 1400 may be implemented by a base station or its components as described herein. For example, the operations of the method 1400 may be performed by a base station 105 as described with reference to FIGS. 1 through 7. In some examples, a base station may execute a set of instructions to control the functional elements of the base station to perform the described functions. Additionally or alternatively, the base station may perform aspects of the described functions using special-purpose hardware.

At 1405, the method may include detecting that a person is within a proximity threshold of the relay node, the proximity threshold being associated with a MPE limit. The operations of 1405 may be performed in accordance with examples as disclosed herein. In some examples, aspects of the operations of 1405 may be performed by a proximity manager 625 as described with reference to FIG. 6.

At 1410, the method may include determining, based on the detecting, that a first beamforming configuration is to be updated, the first beamforming configuration associated with beamformed communications relayed by the relay node between a first wireless node and a second wireless node using a first beam. The operations of 1410 may be performed in accordance with examples as disclosed herein. In some examples, aspects of the operations of 1410 may be performed by a beamforming configuration manager 630 as described with reference to FIG. 6.

At 1415, the method may include identifying a second beamforming configuration for relay of the beamformed communications between the first wireless node and the second wireless node via a second beam having an exposure indicia that satisfies the MPE limit. The operations of 1415 may be performed in accordance with examples as disclosed herein. In some examples, aspects of the operations of 1415 may be performed by a beamforming configuration update manager 635 as described with reference to FIG. 6.

At 1420, the method may include determining that a priority level of a signal associated with the first beamforming configuration satisfies a priority threshold, where the second beamforming configuration is based on the priority level of the signal satisfying the priority threshold. The operations of 1420 may be performed in accordance with examples as disclosed herein. In some examples, aspects of the operations of 1420 may be performed by a priority signal manager 655 as described with reference to FIG. 6.

At 1425, the method may include relaying the beamformed communications between the first wireless node and the second wireless node using the second beam in accordance with the second beamforming configuration. The operations of 1425 may be performed in accordance with examples as disclosed herein. In some examples, aspects of the operations of 1425 may be performed by a relay manager 640 as described with reference to FIG. 6.

Figure 15:
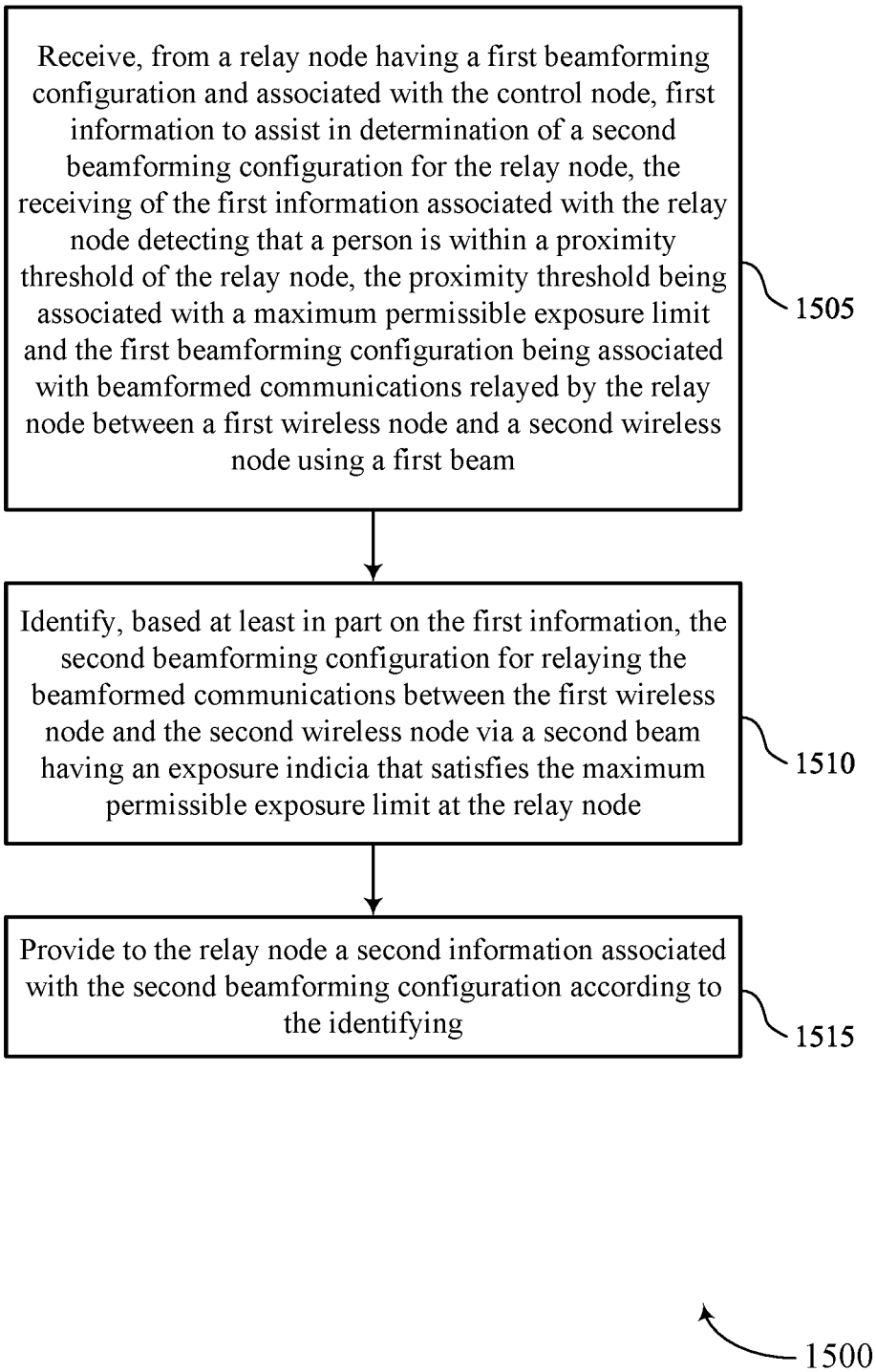

FIG. 15 shows a flowchart illustrating a method 1500 that supports MPE management of repeaters and reflectors in accordance with aspects of the present disclosure. The operations of the method 1500 may be implemented by a base station or a UE or its components as described herein. For example, the operations of the method 1500 may be performed by a base station 105 as described with reference to FIGS. 1 through 7 or a UE 115 as described with reference to FIGS. 1 through 3 and 8 through 11. In some examples, a base station or a UE may execute a set of instructions to control the functional elements of the base station or the UE to perform the described functions. Additionally or alternatively, the base station or the UE may perform aspects of the described functions using special-purpose hardware.

At 1505, the method may include receiving, from a relay node having a first beamforming configuration and associated with the control node, first information to assist in determination of a second beamforming configuration for the relay node, the receiving of the first information associated with the relay node detecting that a person is within a proximity threshold of the relay node, the proximity threshold being associated with a MPE limit and the first beamforming configuration being associated with beamformed communications relayed by the relay node between a first wireless node and a second wireless node using a first beam. The operations of 1505 may be performed in accordance with examples as disclosed herein. In some examples, aspects of the operations of 1505 may be performed by a first information manager 645 or a first information manager 1025 as described with reference to FIGS. 6 and 10.

At 1510, the method may include identifying, based on the first information, the second beamforming configuration for relaying the beamformed communications between the first wireless node and the second wireless node via a second beam having an exposure indicia that satisfies the MPE limit at the relay node. The operations of 1510 may be performed in accordance with examples as disclosed herein. In some examples, aspects of the operations of 1510 may be performed by a beamforming configuration update manager 635 or a beamforming configuration update manager 1030 as described with reference to FIGS. 6 and 10.

At 1515, the method may include providing to the relay node a second information associated with the second beamforming configuration according to the identifying. The operations of 1515 may be performed in accordance with examples as disclosed herein. In some examples, aspects of the operations of 1515 may be performed by a beamforming configuration update manager 635 or a beamforming configuration update manager 1030 as described with reference to FIGS. 6 and 10.

Figure 16:
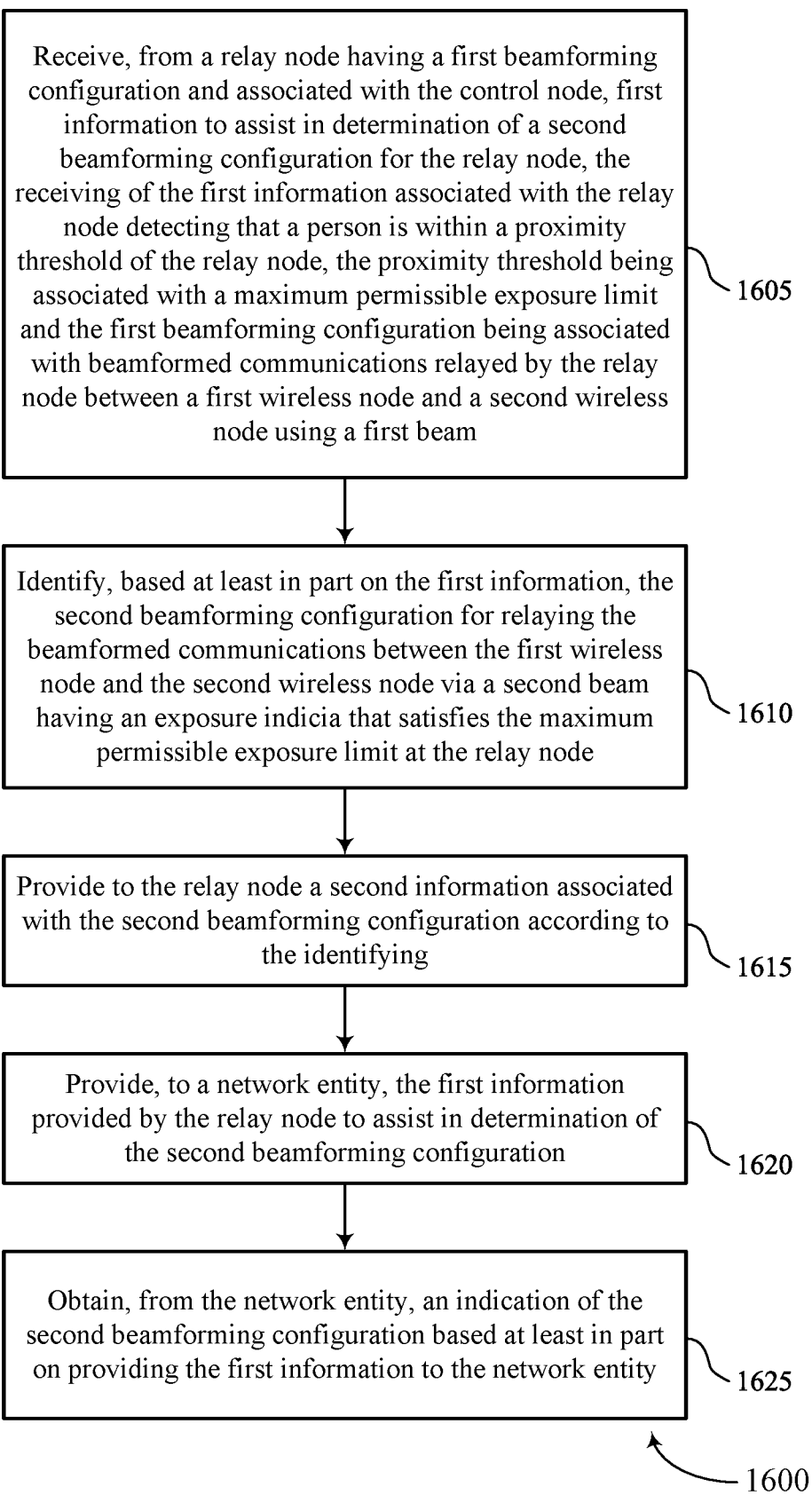

FIG. 16 shows a flowchart illustrating a method 1600 that supports MPE management of repeaters and reflectors in accordance with aspects of the present disclosure. The operations of the method 1600 may be implemented by a base station or a UE or its components as described herein. For example, the operations of the method 1600 may be performed by a base station 105 as described with reference to FIGS. 1 through 7 or a UE 115 as described with reference to FIGS. 1 through 3 and 8 through 11. In some examples, a base station or a UE may execute a set of instructions to control the functional elements of the base station or the UE to perform the described functions. Additionally or alternatively, the base station or the UE may perform aspects of the described functions using special-purpose hardware.

At 1605, the method may include receiving, from a relay node having a first beamforming configuration and associated with the control node, first information to assist in determination of a second beamforming configuration for the relay node, the receiving of the first information associated with the relay node detecting that a person is within a proximity threshold of the relay node, the proximity threshold being associated with a MPE limit and the first beamforming configuration being associated with beamformed communications relayed by the relay node between a first wireless node and a second wireless node using a first beam. The operations of 1605 may be performed in accordance with examples as disclosed herein. In some examples, aspects of the operations of 1605 may be performed by a first information manager 645 or a first information manager 1025 as described with reference to FIGS. 6 and 10.

At 1610, the method may include identifying, based on the first information, the second beamforming configuration for relaying the beamformed communications between the first wireless node and the second wireless node via a second beam having an exposure indicia that satisfies the MPE limit at the relay node. The operations of 1610 may be performed in accordance with examples as disclosed herein. In some examples, aspects of the operations of 1610 may be performed by a beamforming configuration update manager 635 or a beamforming configuration update manager 1030 as described with reference to FIGS. 6 and 10.

At 1615, the method may include providing to the relay node a second information associated with the second beamforming configuration according to the identifying. The operations of 1615 may be performed in accordance with examples as disclosed herein. In some examples, aspects of the operations of 1615 may be performed by a beamforming configuration update manager 635 or a beamforming configuration update manager 1030 as described with reference to FIGS. 6 and 10.

At 1620, the method may include providing, to a network entity, the first information provided by the relay node to assist in determination of the second beamforming configuration. The operations of 1620 may be performed in accordance with examples as disclosed herein. In some examples, aspects of the operations of 1620 may be performed by a network-assisted mode manager 650 or a network-assisted mode manager 1050 as described with reference to FIGS. 6 and 10.

At 1625, the method may include obtaining, from the network entity, an indication of the second beamforming configuration based on providing the first information to the network entity. The operations of 1625 may be performed in accordance with examples as disclosed herein. In some examples, aspects of the operations of 1625 may be performed by a network-assisted mode manager 650 or a network-assisted mode manager 1050 as described with reference to FIGS. 6 and 10.

The following provides an overview of aspects of the present disclosure:

Aspect 1: A method for wireless communication at a relay node associated with a control node, comprising: detecting that a person is within a proximity threshold of the relay node, the proximity threshold being associated with a MPE limit; determining, based at least in part on the detecting, that a first beamforming configuration is to be updated, the first beamforming configuration associated with beamformed communications relayed by the relay node between a first wireless node and a second wireless node using a first beam; identifying a second beamforming configuration for relay of the beamformed communications between the first wireless node and the second wireless node via a second beam having an exposure indicia that satisfies the MPE limit; and relaying the beamformed communications between the first wireless node and the second wireless node using the second beam in accordance with the second beamforming configuration.

Aspect 2: The method of aspect 1, further comprising: providing to the control node and triggered by the detecting that the person is within the proximity threshold of the relay node, a first information to assist in determination of the second beamforming configuration.

Aspect 3: The method of aspect 2, wherein the first information comprises a distance of the person from the relay node, a direction of the person from the relay node, or both.

Aspect 4: The method of any of aspects 2 through 3, wherein the first information comprises a first transmit power of the first beamforming configuration, a second transmit power of the second beamforming configuration, a first power headroom value of the first beamforming configuration, a second power headroom value of the second beamforming configuration, or a combination thereof.

Aspect 5: The method of any of aspects 2 through 4, wherein the first information comprises a first duty cycle of the first beamforming configuration, a second duty cycle of the second beamforming configuration, or both.

Aspect 6: The method of any of aspects 2 through 5, wherein the first information comprises a first request to perform the beamformed communications using the second beam, a second request for a receive beam of the second wireless node to use for the beamformed communications, a change request for a TCI state for the beamformed communications, or a combination thereof.

Aspect 7: The method of any of aspects 2 through 6, further comprising: obtaining, responsive to the first information, second information associated with the second beamforming configuration.

Aspect 8: The method of aspect 7, wherein the second information associated with the second beamforming configuration comprises a maximum transmit power level for the second beamforming configuration, a duty cycle for a beamforming direction using the second beamforming configuration, the second beamforming configuration, or a combination thereof.

Aspect 9: The method of any of aspects 1 through 8, further comprising: determining that a priority level of a signal associated with the first beamforming configuration satisfies a priority threshold, wherein the second beamforming configuration is based at least in part on the priority level of the signal satisfying the priority threshold.

Aspect 10: The method of aspect 9, wherein the second beamforming configuration maintains a transmit power of the signal based at least in part on the priority level of the signal satisfying the priority threshold.

Aspect 11: The method of any of aspects 9 through 10, wherein the signal comprises at least one of an SSB, a CSI-RS, or both.

Aspect 12: The method of any of aspects 1 through 11, further comprising: providing to the control node an indication that the relay node is relaying the beamformed communications between the first wireless node and the second wireless node using the second beam.

Aspect 13: The method of any of aspects 1 through 12, further comprising: identifying a TDD configuration for the beamformed communications, wherein the second beamforming configuration is based at least in part on the TDD configuration.

Aspect 14: The method of any of aspects 1 through 13, further comprising: performing a proximity detection procedure to detect whether the person is within the proximity threshold of the relay node using one or more proximity detection sensors.

Aspect 15: The method of aspect 14, wherein the proximity detection procedure is performed on per-beam basis, on a per-beamforming configuration basis, on a per-active beam configuration, on a per-requested beam basis, on a per-beamforming direction basis, or a combination thereof.

Aspect 16: The method of any of aspects 1 through 15, wherein the relay node comprises a repeater associated with the control node or a reflector associated with the control node.

Aspect 17: A method for wireless communication at a control node, comprising: receiving, from a relay node having a first beamforming configuration and associated with the control node, first information to assist in determination of a second beamforming configuration for the relay node, the receiving of the first information associated with the relay node detecting that a person is within a proximity threshold of the relay node, the proximity threshold being associated with a MPE limit and the first beamforming configuration being associated with beamformed communications relayed by the relay node between a first wireless node and a second wireless node using a first beam; identifying, based at least in part on the first information, the second beamforming configuration for relaying the beamformed communications between the first wireless node and the second wireless node via a second beam having an exposure indicia that satisfies the MPE limit at the relay node; and providing to the relay node a second information associated with the second beamforming configuration according to the identifying.

Aspect 18: The method of aspect 17, further comprising: identifying one or more scheduling configurations for the beamformed communications using the second beam according to the second beamforming configuration based at least in part on the first information provided by the relay node to assist in determination of the second beamforming configuration.

Aspect 19: The method of any of aspects 17 through 18, further comprising: determining that a priority level of a signal associated with the first beamforming configuration satisfies a priority threshold, wherein the second beamforming configuration is based at least in part on the priority level of the signal satisfying the priority threshold.

Aspect 20: The method of aspect 19, wherein the second beamforming configuration maintains a transmit power of the signal based at least in part on the priority level of the signal satisfying the priority threshold.

Aspect 21: The method of any of aspects 19 through 20, wherein the signal comprises at least one of an SSB, a CSI-RS, or both.

Aspect 22: The method of any of aspects 17 through 21, further comprising: obtaining from the relay node an indication that the relay node is relaying the beamformed communications between the first wireless node and the second wireless node using the second beam.

Aspect 23: The method of any of aspects 17 through 22, further comprising: providing, to a network entity, the first information provided by the relay node to assist in determination of the second beamforming configuration; and obtaining, from the network entity, an indication of the second beamforming configuration based at least in part on providing the first information to the network entity.

Aspect 24: The method of any of aspects 17 through 23, wherein the first information provided by the relay node to assist in determination of the second beamforming configuration comprises a distance of the person from the relay node, a direction of the person from the relay node, the first beamforming configuration, the second beamforming configuration, a first transmit power of the first beamforming configuration, a second transmit power of the second beamforming configuration, a first duty cycle of the first beamforming configuration, a second duty cycle of the second beamforming configuration, a first request to perform the beamformed communications using the second beam, a second request for a receive beam of the second wireless node to use for the beamformed communications, a change request for a TCI state for the beamformed communications, or a combination thereof.

Aspect 25: The method of any of aspects 17 through 24, wherein the second information associated with the second beamforming configuration comprises a maximum transmit power level for the second beamforming configuration, a duty cycle for a beamforming direction using the second beamforming configuration, the second beamforming configuration, a reflector coefficient of a reflection pattern associated with the second beam, or a combination thereof.

Aspect 26: The method of any of aspects 17 through 25, wherein the control node comprises a base station or a UE.

Aspect 27: An apparatus for wireless communication at a relay node associated with a control node, comprising a processor; memory coupled with the processor; and instructions stored in the memory and executable by the processor to cause the apparatus to perform a method of any of aspects 1 through 16.

Aspect 28: An apparatus for wireless communication at a relay node associated with a control node, comprising at least one means for performing a method of any of aspects 1 through 16.

Aspect 29: A non-transitory computer-readable medium storing code for wireless communication at a relay node associated with a control node, the code comprising instructions executable by a processor to perform a method of any of aspects 1 through 16.

Aspect 30: An apparatus for wireless communication at a control node, comprising a processor; memory coupled with the processor; and instructions stored in the memory and executable by the processor to cause the apparatus to perform a method of any of aspects 17 through 26.

Aspect 31: An apparatus for wireless communication at a control node, comprising at least one means for performing a method of any of aspects 17 through 26.

Aspect 32: A non-transitory computer-readable medium storing code for wireless communication at a control node, the code comprising instructions executable by a processor to perform a method of any of aspects 17 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a relay node associated with a control node, comprising:
   detecting that a person is within a proximity threshold of the relay node, the proximity threshold being associated with a maximum permissible exposure limit;
   determining, based at least in part on the detecting, that a first beamforming configuration is to be updated, the first beamforming configuration associated with beamformed communications relayed by the relay node between a first wireless node and a second wireless node using a first beam;
   identifying a second beamforming configuration for relay of the beamformed communications between the first wireless node and the second wireless node via a second beam having an exposure indicia that satisfies the maximum permissible exposure limit; and
   relaying the beamformed communications between the first wireless node and the second wireless node using the second beam in accordance with the second beamforming configuration.

2. The method of claim 1, further comprising:
   providing to the control node and triggered by the detecting that the person is within the proximity threshold of the relay node, a first information to assist in determination of the second beamforming configuration.

3. The method of claim 2, wherein the first information comprises a distance of the person from the relay node, a direction of the person from the relay node, or both.

4. The method of claim 2, wherein the first information comprises a first transmit power of the first beamforming configuration, a second transmit power of the second beamforming configuration, a first power headroom value of the first beamforming configuration, a second power headroom value of the second beamforming configuration, or a combination thereof.

5. The method of claim 2, wherein the first information comprises a first duty cycle of the first beamforming configuration, a second duty cycle of the second beamforming configuration, or both.

6. The method of claim 2, wherein the first information comprises a first request to perform the beamformed communications using the second beam, a second request for a receive beam of the second wireless node to use for the beamformed communications, a change request for a transmission configuration indicator state (TCI) state for the beamformed communications, or a combination thereof.

7. The method of claim 2, further comprising:
   obtaining, responsive to the first information, second information associated with the second beamforming configuration.

8. The method of claim 7, wherein the second information associated with the second beamforming configuration comprises a maximum transmit power level for the second beamforming configuration, a duty cycle for a beamforming direction using the second beamforming configuration, the second beamforming configuration, or a combination thereof.

9. The method of claim 1, further comprising:
   determining that a priority level of a signal associated with the first beamforming configuration satisfies a priority threshold, wherein the second beamforming configuration is based at least in part on the priority level of the signal satisfying the priority threshold.

10. The method of claim 9, wherein the second beamforming configuration maintains a transmit power of the signal based at least in part on the priority level of the signal satisfying the priority threshold.

11. The method of claim 9, wherein the signal comprises at least one of a synchronization signal block, a channel state information reference signal, or both.

12. The method of claim 1, further comprising:
   providing to the control node an indication that the relay node is relaying the beamformed communications between the first wireless node and the second wireless node using the second beam.

13. The method of claim 1, further comprising:
   identifying a time division duplexing (TDD) configuration for the beamformed communications, wherein the second beamforming configuration is based at least in part on the TDD configuration.

14. The method of claim 1, further comprising:
performing a proximity detection procedure to detect whether the person is within the proximity threshold of the relay node using one or more proximity detection sensors.

15. The method of claim 14, wherein the proximity detection procedure is performed on per-beam basis, on a per-beamforming configuration basis, on a per-active beam configuration, on a per-requested beam basis, on a per-beamforming direction basis, or a combination thereof.

16. The method of claim 1, wherein the relay node comprises a repeater associated with the control node or a reflector associated with the control node.

17. An apparatus for wireless communication at a relay node associated with a control node, comprising:
a processor;
memory coupled with the processor; and
instructions stored in the memory and executable by the processor to cause the apparatus to:
detect that a person is within a proximity threshold of the relay node, the proximity threshold being associated with a maximum permissible exposure limit;
determine, based at least in part on the detecting, that a first beamforming configuration is to be updated, the first beamforming configuration associated with beamformed communications relayed by the relay node between a first wireless node and a second wireless node using a first beam;
identify a second beamforming configuration for relay of the beamformed communications between the first wireless node and the second wireless node via a second beam having an exposure indicia that satisfies the maximum permissible exposure limit; and
relay the beamformed communications between the first wireless node and the second wireless node using the second beam in accordance with the second beamforming configuration.

18. The apparatus of claim 17, wherein the instructions are further executable by the processor to cause the apparatus to:
provide to the control node and triggered by the detecting that the person is within the proximity threshold of the relay node, a first information to assist in determination of the second beamforming configuration.

19. The apparatus of claim 18, wherein the first information comprises a distance of the person from the relay node, a direction of the person from the relay node, or both.

* * * * *